(12) United States Patent
Ivanov et al.

(10) Patent No.: US 12,487,165 B2
(45) Date of Patent: Dec. 2, 2025

(54) AUTOMATED CELL SORTING STAGE AND METHODS FOR USING SAME

(71) Applicant: Becton, Dickinson and Company, Franklin Lakes, NJ (US)

(72) Inventors: Nikolay Ivanov, San Jose, CA (US); Jorge Manzarraga, Sunnyvale, CA (US)

(73) Assignee: BECTON, DICKINSON AND COMPANY, Franklin Lakes, NJ (US)

( * ) Notice: Subject to any disclaimer, the term of this patent is extended or adjusted under 35 U.S.C. 154(b) by 657 days.

(21) Appl. No.: 17/941,758

(22) Filed: Sep. 9, 2022

(65) Prior Publication Data

US 2023/0111548 A1 Apr. 13, 2023

Related U.S. Application Data

(60) Provisional application No. 63/243,867, filed on Sep. 14, 2021.

(51) Int. Cl.
| | |
|---|---|
| *G01N 15/1404* | (2024.01) |
| *B01L 3/00* | (2006.01) |
| *G01F 1/661* | (2022.01) |
| *G01N 15/02* | (2024.01) |
| *G01N 15/14* | (2024.01) |

(52) U.S. Cl.
CPC .... *G01N 15/1404* (2013.01); *B01L 3/502715* (2013.01); *B01L 3/502761* (2013.01); *G01F 1/661* (2013.01); *G01N 15/1459* (2013.01); *G01N 2015/0288* (2013.01)

(58) Field of Classification Search
CPC ........... G01N 15/1404; G01N 15/1459; G01N 2015/0288; G01N 15/149; G01N 2015/1452; G01N 2015/1493; G01N 15/1425; G01N 15/1434; G01N 15/147; G01N 2015/1006; B01L 3/502715; B01L 3/502761; G01F 1/661
See application file for complete search history.

(56) References Cited

U.S. PATENT DOCUMENTS

| | | | |
|---|---|---|---|
| 6,507,400 B1 | 1/2003 | Pina et al. | |
| 6,817,104 B2 | 11/2004 | Kaneko et al. | |
| 6,911,747 B2 | 6/2005 | Tsuboi et al. | |
| 7,078,712 B2 | 7/2006 | Perel et al. | |
| 8,614,783 B2 | 12/2013 | Eussen et al. | |
| 9,855,587 B2 | 1/2018 | Ito | |
| 2003/0112432 A1 | 6/2003 | Yguerabide et al. | |
| 2005/0095094 A1 | 5/2005 | Maynard et al. | |
| 2009/0178472 A1* | 7/2009 | Banke, Jr. ............. | G01Q 40/00 73/1.79 |
| 2011/0033339 A1 | 2/2011 | Muraki et al. | |
| 2011/0259749 A1 | 10/2011 | Kanda | |
| 2014/0144817 A1 | 5/2014 | Hashimoto et al. | |
| 2014/0306122 A1 | 10/2014 | Norton et al. | |
| 2017/0350911 A1 | 12/2017 | Covey et al. | |
| 2020/0129982 A1 | 4/2020 | Zhou | |
| 2020/0132590 A1* | 4/2020 | Dembski ........... | G01N 15/1425 |
| 2021/0255089 A1* | 8/2021 | Norton ............... | G01N 15/1427 |

FOREIGN PATENT DOCUMENTS

| | | | | |
|---|---|---|---|---|
| EP | 3842149 A1 | 12/2020 | | |
| WO | WO-2020141327 A1 * | 7/2020 | ......... | A61K 48/0091 |

OTHER PUBLICATIONS

Lika Electronic SRL, "Smart Encoder & Actuators", 2018, 44 pages.
RLS, "New in-axis magnetic encoder integrated into linear actuators provides best accuracy in closed-loop applications" www.rls.si, 2 pages, 2012.

* cited by examiner

Primary Examiner — Cynthia B Wilder
(74) Attorney, Agent, or Firm — Christian S. Hans; Bret E. Field; BOZICEVIC, FIELD & FRANCIS LLP

(57) ABSTRACT

Aspects of the disclosure include systems for sorting particles of a sample in a flow stream (e.g., a biological sample containing cells). Systems according to certain embodiments include a flow cell configured to propagate a sample through a flow stream, a light source configured to irradiate particles of the sample in the flow stream, a photodetector configured to detect light from the irradiated particles and a support stage operationally coupled to the photodetector, where the support stage includes a closed-loop feedback position encoder that is configured to adjust position in the X-Y plane in response to a data signal generated by the photodetector in response to light from the irradiated particles. Methods for sorting particles using the subject systems are also described. Non-transitory computer readable storage medium are also provided.

19 Claims, 11 Drawing Sheets

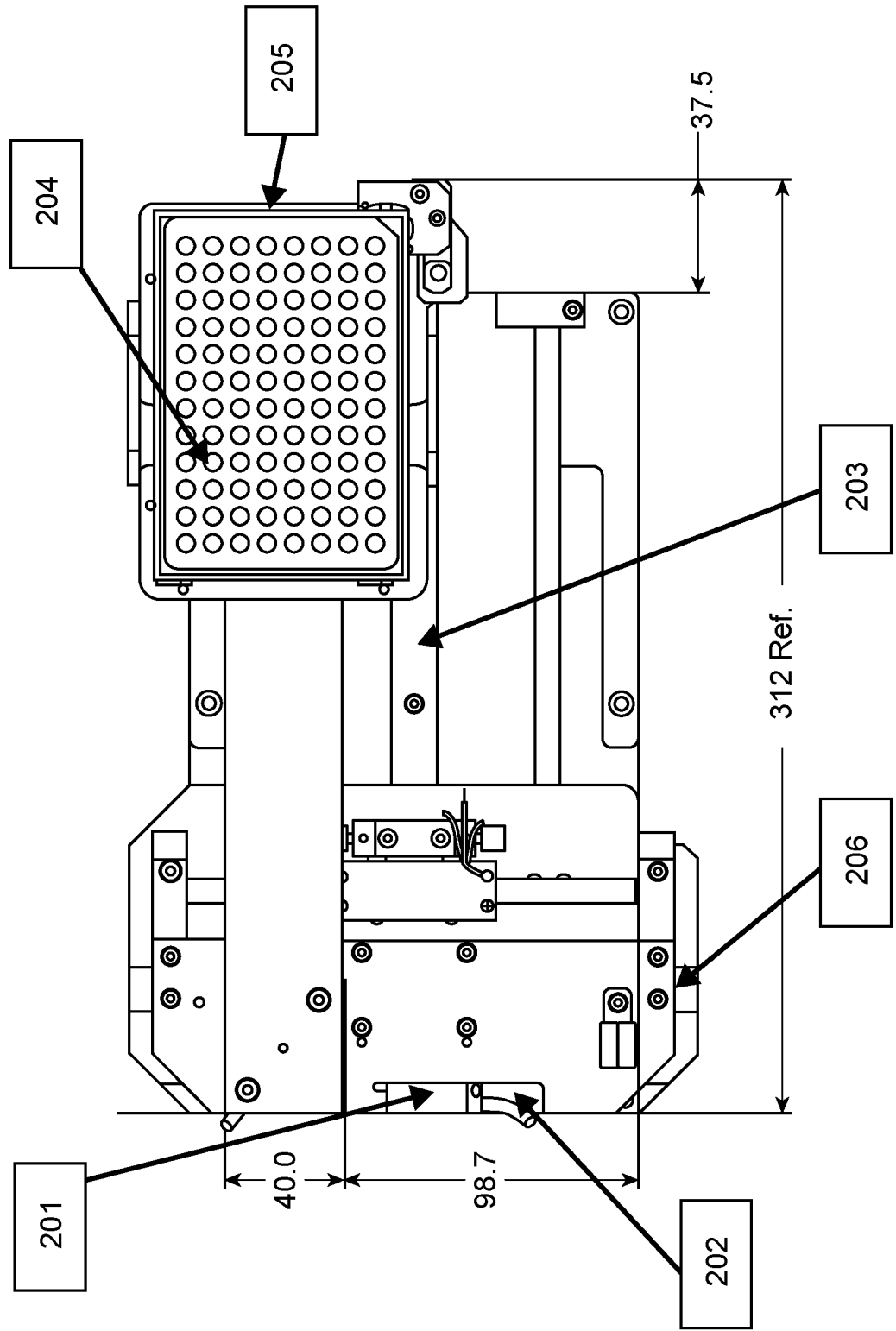

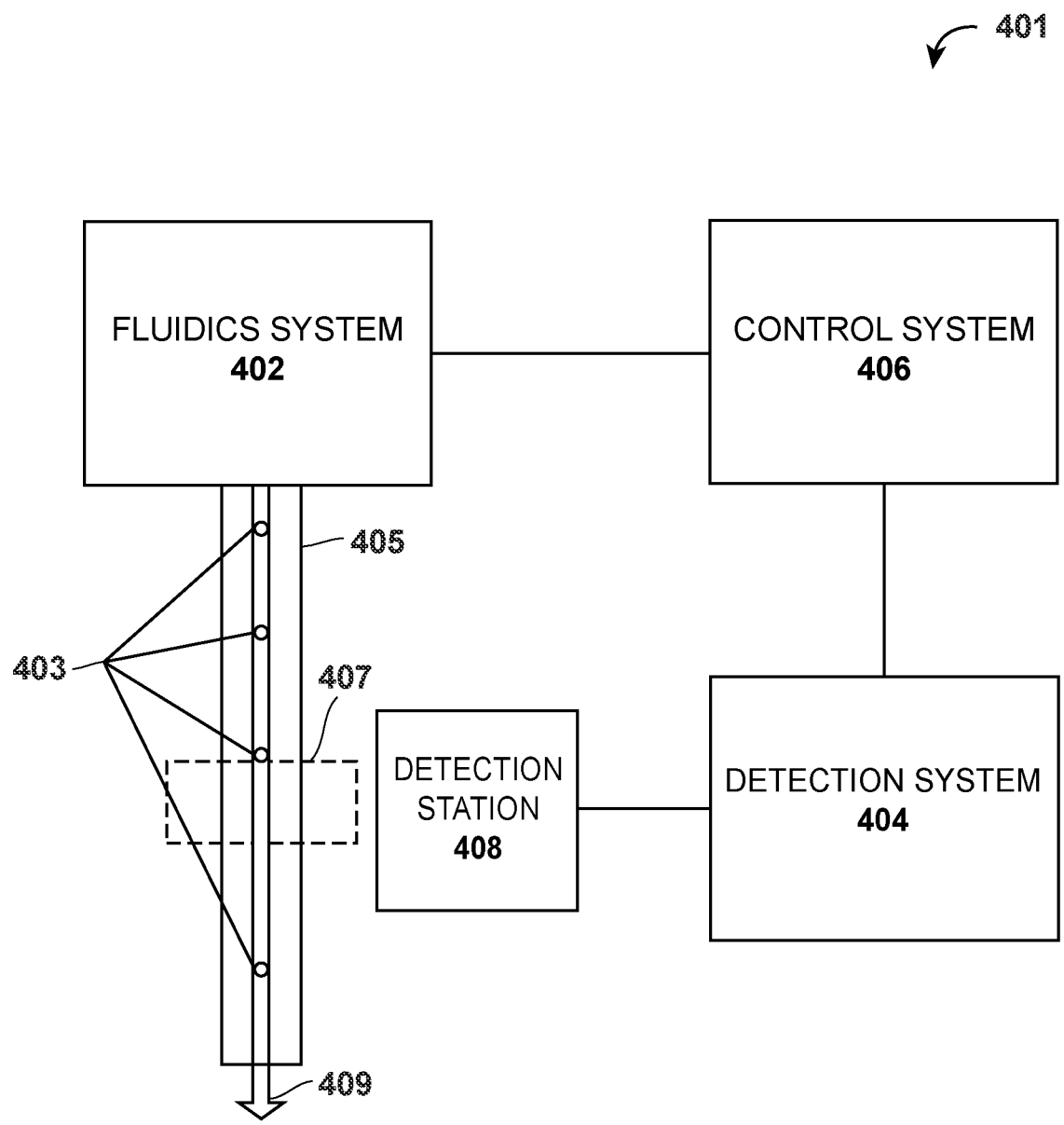

AUTOMATED CELL SORTING STAGE AND METHODS FOR USING SAME

CROSS-REFERENCE TO RELATED APPLICATIONS

Pursuant to 35 U.S.C. § 119 (e), this application claims priority to the filing date of U.S. Provisional Patent Application Ser. No. 63/243,867 filed Sep. 14, 2021; the disclosure of which application is incorporated herein by reference in their entirety.

INTRODUCTION

Flow cytometers known in the art are used for analyzing and sorting particles in a fluid sample, such as cells of a blood sample or particles of interest in any other type of biological or chemical sample. A flow cytometer typically includes a sample reservoir for receiving a fluid sample, such as a blood sample, and a sheath reservoir containing a sheath fluid. The flow cytometer transports the particles (hereinafter called "cells") in the fluid sample as a cell stream to a flow cell, while also directing the sheath fluid to the flow cell.

Within the flow cell, a liquid sheath is formed around the cell stream to impart a substantially uniform velocity on the cell stream. The flow cell hydrodynamically focuses the cells within the stream to pass through the center of a laser beam in a flow cell. The point at which the cells intersect the laser beam is commonly known as the interrogation point. As a cell moves through the interrogation point, it causes the laser light to scatter. The laser light also excites components in the cell stream that have fluorescent properties, such as fluorescent markers that have been added to the fluid sample and adhered to certain cells of interest, or fluorescent beads mixed into the stream. The flow cytometer includes an appropriate detection system consisting of photomultiplier tubes, photodiodes or other light detecting devices, which are focused at the intersection point. The flow cytometer analyzes the detected light to measure physical and fluorescent properties of the cell. The flow cytometer can further sort the cells based on these measured properties. The flow stream exits the flow cell via a nozzle with a nozzle diameter that is appropriate for the fluidics system and sort rate desired.

To sort cells by an electrostatic method, the desired cell must be contained within an electrically charged droplet. To produce droplets, the flow cell is rapidly vibrated by an acoustic device, such as a piezoelectric element. The volume of a droplet is conventionally estimated by the hydrodynamic properties of the flow stream and the nozzle dimensions. To charge the droplet, the flow cell includes a charging element whose electrical potential can be rapidly changed. Because the cell stream exits the flow cell in a substantially downward vertical direction, the droplets also propagate in that direction after they are formed. Droplets, whether they are charged or are uncharged must be collected in a sample collection vessel that is appropriately directed to collect the one or more flow streams generated by the deflection plates. Accordingly, the droplets and the cells contained therein may be collected in appropriate collection vessels downstream of the plates.

Although this method generally enables the flow cytometer to dispense sorted cells into collection vessels and therefore sort the cells of interest with reasonable accuracy, the method requires a substantial amount of user input at the time of set-up. The flow stream and collection vessels are conventionally manually aligned. The fluidics parameters such as flow rate and sheath fluid composition must be matched with an appropriate nozzle diameter.

SUMMARY

Aspects of the disclosure include systems for sorting particles of a sample in a flow stream (e.g., a biological sample containing cells). Systems according to certain embodiments include a flow cell configured to propagate a sample through a flow stream, a light source configured to irradiate particles of the sample in the flow stream, a photodetector configured to detect light from the irradiated particles and a support stage operationally coupled to the photodetector, where the support stage includes a closed-loop feedback position encoder that is configured to adjust position in the X-Y plane in response to a data signal generated by the photodetector in response to light from the irradiated particles.

In certain embodiments, the subject systems are configured to provide precise positioning resolution for support stages in a particle sorter and accurate particle separation from a sample. In some instances, the subject systems are zero-cogging systems. The support stages provide for closed-loop feedback control such that motion and position of the support stages are monitored and corrective actions may be taken for errors in one of more of the position, velocity and acceleration of the support stage in the X-Y plane in real time. The support stages used for particle sorting in the subject systems have precise bidirectional repeatability and continuous motion control. In some instances, the support stage exhibits little-to-no mechanical backlash and does not require supplemental components to achieve rotary-to-linear motion. In certain instances, the subject systems reduce the need for user input or manual adjustment during sample analysis with a flow cytometer. In some embodiments, systems of interest may be partially or fully automated so that adjustments to parameters of a flow cytometer are processor controlled. In certain embodiments, the subject systems are configured to adjust one or more parameters of the flow cytometer without any human input.

In some embodiments, the particle sorter includes a closed-loop feedback position encoder having a positive feedback closed-loop position encoder. In other embodiments, the closed-loop feedback position encoder is a negative feedback closed-loop position encoder. In certain instances, the closed-loop feedback position encoder includes a magnetic encoder. In some instances, the closed-loop feedback position encoder includes an incremental magnetic encoder. In some instances, the closed-loop feedback position encoder includes a continuous motion magnetic encoder.

In some embodiments, the position encoder is configured to generate a data signal that includes the position of the support stage in the X-Y plane. In some instances, the position encoder is configured to generate a position map of the support stage in the X-Y plane. In some instances, the position encoder is configured to generate a data signal that includes the velocity of support stage movement in the X-Y plane. In some instances, the position encoder is configured to generate a data signal that includes the acceleration of support stage movement in the X-Y plane. In certain embodiments, the position encoder is configured to provide real-time closed-loop feedback for one or more of the position, velocity and acceleration of the support stage in the X-Y plane. In certain instances, the position encoder is configured to adjust one or more of the position, velocity and acceleration of the support stage in the X-Y plane in real time in response to data signals generated by the photodetector in response to light from the irradiated particles.

In some embodiments, the support stage includes a linear shaft servomotor. In some embodiments, the linear shaft servomotor is a continuous motion servomotor. In other embodiments, the linear shaft servomotor is a bidirectional motion servomotor. In some instances, the support stage further includes a sample collection container, such as a microplate. In certain instances, the support stage further includes a temperature controller, such as to adjust the temperature of the sample collection container.

Aspects of the disclosure also include methods for adjusting a position of a support stage of a particle sorter. Methods according to certain embodiments include irradiating with a light source a sample having particles in a flow stream, detecting light from the irradiated particles in the flow stream, generating a data signal corresponding to a spatial position of droplets containing the particles from the flow stream in an X-Y plane and adjusting in the X-Y plane a position of a support stage with a closed-loop feedback position encoder in response to the generated data signal. In some embodiments, methods include aligning the support stage with the spatial position of the droplets from the flow stream. In some embodiments, methods include aligning the support stage by mapping the position of the droplets from the flow stream in the X-Y plane. In certain embodiments, aligning the support stage with droplets of the flow stream includes mapping the position of the droplets of the flow stream in an X-Y plane, mapping the position of the support stage in the X-Y plane and matching the position of the support stage with the position of the droplets of the flow stream in the X-Y plane.

In some embodiments, the method includes generating a data signal with the position encoder that comprises the position of the support stage in the X-Y plane. In some instances, methods include generating with the position encoder a position map of the support stage in the X-Y plane. In some embodiments, methods include generating with the position encoder a data signal that comprises the velocity of support stage movement in the X-Y plane. In other embodiments, methods include generating with the position encoder a data signal that comprises the acceleration of support stage movement in the X-Y plane. In certain embodiments, the position encoder is configured to provide real-time closed-loop feedback for one or more of the position, velocity and acceleration of the support stage in the X-Y plane. In certain instances, the position encoder is configured to adjust one or more of the position, velocity and acceleration of the support stage in the X-Y plane in real time in response to data signals generated by the photodetector in response to light from the irradiated particles.

In some instances, methods include adjusting the temperature of a sample collection container positioned on the support stage. In certain instances, the temperature of the sample collection container is adjusted with a temperature controller incorporated with the support stage.

Aspects of the present disclosure also include computer controlled systems for practicing the subject methods, where the systems further include one or more computers having processors configured to automate one or more steps of the methods described herein. In some embodiments, systems include a computer having a computer readable storage medium with a computer program stored thereon, where the computer program when loaded on the computer includes algorithm for irradiating with a light source a sample comprising particles in a flow stream, algorithm for detecting light from the irradiated particles in the flow stream, algorithm for generating a data signal corresponding to a spatial position of droplets comprising particles from the flow stream in an X-Y plane and algorithm for adjusting in the X-Y plane a position of a support stage with a closed-loop feedback position encoder in response to the generated data signal. In some instances, the computer program includes algorithm for aligning the support stage with the spatial position of the droplets from the flow stream. In some embodiments, the computer program includes algorithm for aligning the support stage by mapping the position of the droplets from the flow stream in the X-Y plane. In certain embodiments, the computer program includes algorithm for aligning the support stage with droplets of the flow stream by mapping the position of the droplets of the flow stream in an X-Y plane, mapping the position of the support stage in the X-Y plane and matching the position of the support stage with the position of the droplets of the flow stream in the X-Y plane.

In some embodiments, the computer program includes algorithm for generating a data signal with the position encoder that comprises the position of the support stage in the X-Y plane. In some instances, the computer program includes algorithm for generating with the position encoder a position map of the support stage in the X-Y plane. In some embodiments, the computer program includes algorithm for generating with the position encoder a data signal that comprises the velocity of support stage movement in the X-Y plane. In other embodiments, the computer program includes algorithm for generating with the position encoder a data signal that comprises the acceleration of support stage movement in the X-Y plane. In certain embodiments, the computer program includes algorithm for providing real-time closed-loop feedback for one or more of the position, velocity and acceleration of the support stage in the X-Y plane. In certain instances, the computer program includes algorithm for adjusting one or more of the position, velocity and acceleration of the support stage in the X-Y plane in real time in response to data signals generated by the photodetector in response to light from the irradiated particles.

BRIEF DESCRIPTION OF THE FIGURES

The invention may be best understood from the following detailed description when read in conjunction with the accompanying drawings. Included in the drawings are the following figures:

FIG. 2 depicts a schematic top-view illustration of an X-Y stage according to certain embodiments.

FIG. 4A depicts a functional block diagram of a particle analysis system according to certain embodiments.

DETAILED DESCRIPTION

Figure 1A:
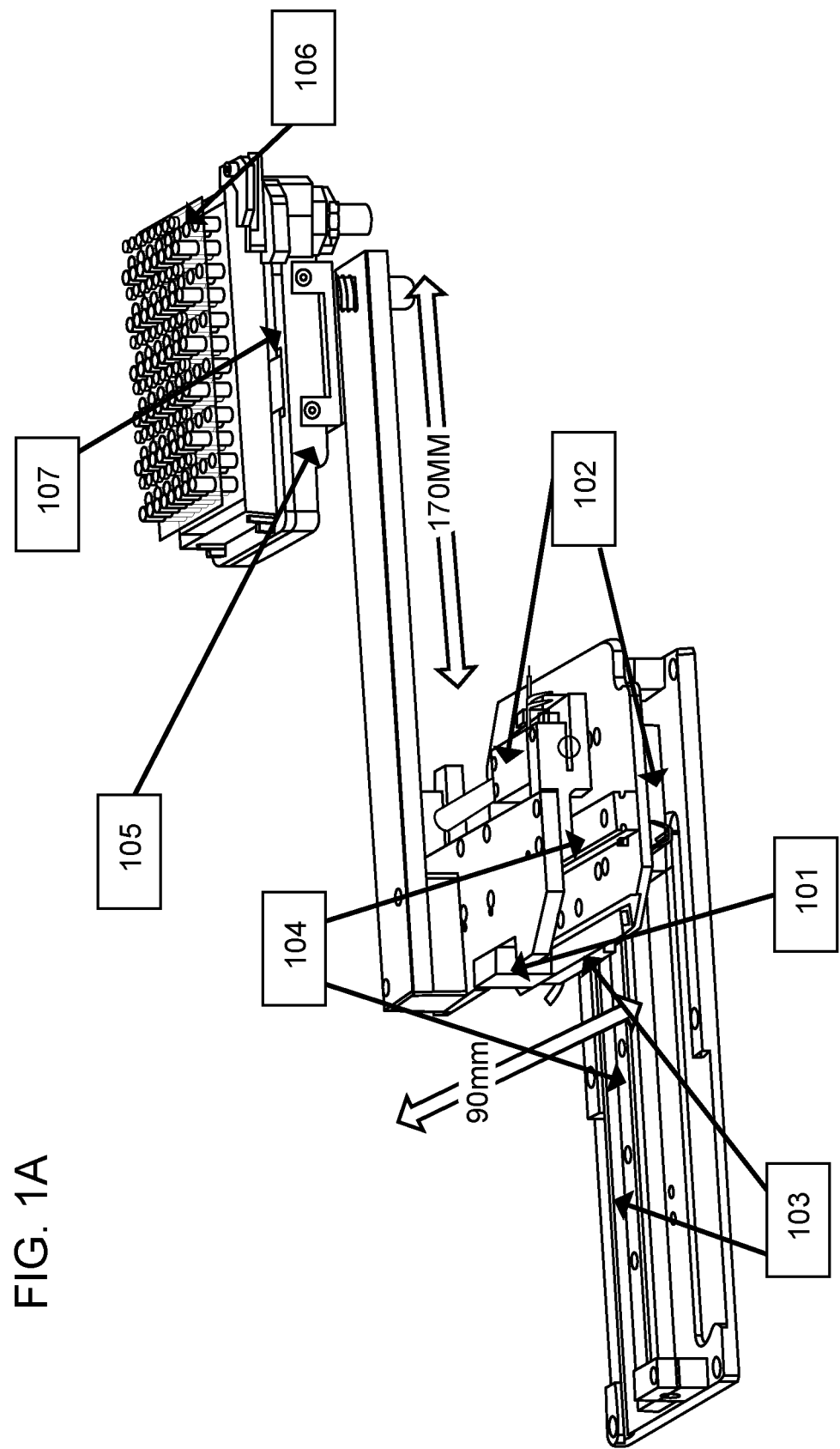
FIG. 1A depicts a schematic illustration of an X-Y stage including position encoder, linear shaft motors, rail/slides and tray holder according to certain embodiments.
Figure 1A:
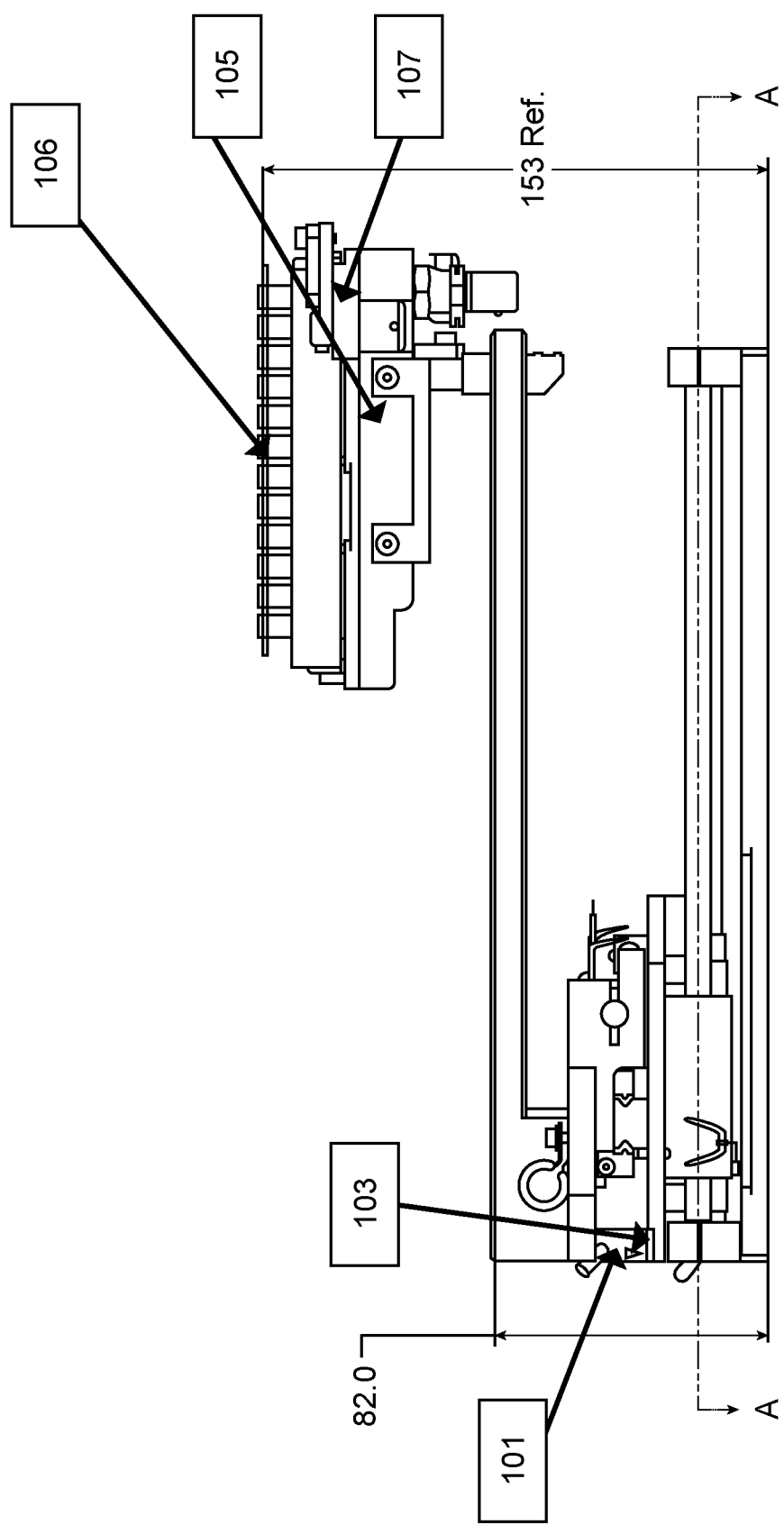

Aspects of the disclosure include systems for sorting particles of a sample in a flow stream (e.g., a biological sample containing cells). Systems according to certain embodiments include a flow cell configured to propagate a sample through a flow stream, a light source configured to irradiate particles of the sample in the flow stream, a photodetector configured to detect light from the irradiated particles and a support stage operationally coupled to the photodetector, where the support stage includes a closed-loop feedback position encoder that is configured to adjust position in the X-Y plane in response to a data signal generated by the photodetector in response to light from the irradiated particles. Methods for sorting particles using the subject systems are also described. Non-transitory computer readable storage medium are also provided.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

While the apparatus and method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

As summarized above, the present disclosure provides systems for sorting particles of a sample in a flow stream (e.g., a biological sample containing cells). In further describing embodiments of the disclosure, systems having a support stage that includes a closed-loop feedback position encoder that is configured to adjust position in the X-Y plane in response to a data signal generated by a photodetector in response to light from the irradiated particles are first described in greater detail. Next, methods for adjusting a position of a support stage in the subject particle sorters are described. Computer controlled systems and kits are also provided.

Systems for Adjusting a Support Stage for Sorting Particles of a Sample

Aspects of the disclosure include systems for sorting particles of a sample in a flow stream (e.g., a biological sample containing cells). In certain embodiments, the subject systems include a closed-loop feedback position encoder that is configured to adjust position in the X-Y plane of support stages for sorting particles in response to data signals generated by the photodetector in response to light from the irradiated particles. In some instances, closed-loop feedback position encoders provide for high positioning resolution and motion control for the support stages in a particle sorter. The closed-loop feedback control provides for continuous sensing and evaluation of the position and motion of the support stages such that corrective actions can be taken in real time, improving particle separation accuracy and increasing particle collection yield. As described in greater detail below, the support stages of the present disclosure have precise bidirectional repeatability, continuous rotary-to-linear motion with little-to-no mechanical backlash. In certain instances, the closed-loop feedback position encoding and mechanical motion control reduce the need for user input or manual adjustment during particle sorting. In some embodiments, particle sorting may be partially or fully automated so that adjustments to parameters of particle sorting are fully computer controlled. In certain embodiments, the subject systems are configured to adjust one or more sorting parameters without human input.

In some embodiments, the subject systems provide for precise adjustments to a support stage for particle sorting in a particle sorter. The term "adjusting" is used herein in its conventional sense to refer to changing one or more functional parameters of particle sorting, such as the position (e.g., in the X-Y plane) of the support stage or the velocity or acceleration of the support stage. The adjustments to the functional parameters of the support stage for sorting particles of a sample may vary in terms of goal, where in some instances the desired adjustments are adjustments that ultimately result in enhancement of some desirable parameter, e.g., more accurate position encoding, fast support stage position adjustments, corrective feedback that improves cell sorting accuracy, enhances particle collection yield, increases particle charging efficiency, provides more accurate particle charging, enhances particle deflection during cell sorting, among other adjustments. In some instances, the subject systems are configured to reduce the need for user input or manual adjustment during sample analysis with a flow cytometer. In certain embodiments, systems of interest may be fully automated so that adjustments are processor controlled. By "fully automated" is meant that adjustments made in response to data signals from the closed-loop feedback position encoder requires little to no human intervention or manual input into the subject systems.

As summarized above, systems include one or more light sources for irradiating a sample having particles (e.g., a biological sample having cells) propagating through a flow stream. In some embodiments, the light source is a continuous wave light source, such as where the light source provides uninterrupted light flux and maintains irradiation of particles in the flow stream with little to no undesired changes in light intensity. In some embodiments, the continuous light source emits non-pulsed or non-stroboscopic irradiation. In certain embodiments, the continuous light source provides for substantially constant emitted light intensity. For instance, the continuous light source may provide for emitted light intensity during a time interval of irradiation that varies by 10% or less, such as by 9% or less, such as by 8% or less, such as by 7% or less, such as by 6% or less, such as by 5% or less, such as by 4% or less, such as by 3% or less, such as by 2% or less, such as by 1% or less, such as by 0.5% or less, such as by 0.1% or less, such as by 0.01% or less, such as by 0.001% or less, such as by 0.0001% or less, such as by 0.00001% or less and including where the emitted light intensity during a time interval of irradiation varies by 0.000001% or less. The intensity of light output can be measured with any convenient protocol, including but not limited to, a scanning slit profiler, a charge coupled device (CCD, such as an intensified charge coupled device, ICCD), a positioning sensor, power sensor (e.g., a thermopile power sensor), optical power sensor, energy meter, digital laser photometer, a laser diode detector, among other types of photodetectors.

In some embodiments, the light source includes one or more pulsed light sources, such as where light is emitted at predetermined time intervals, each time interval having a predetermined irradiation duration (i.e., pulse width). In certain embodiments, the pulsed light source is configured to irradiate the photodetector with periodic flashes of light. For example, the frequency of each light pulse may be 0.0001 kHz or greater, such as 0.0005 kHz or greater, such as 0.001 kHz or greater, such as 0.005 kHz or greater, such as 0.01 kHz or greater, such as 0.05 kHz or greater, such as 0.1 kHz or greater, such as 0.5 kHz or greater, such as 1 kHz or greater, such as 2.5 kHz or greater, such as 5 kHz or greater, such as 10 kHz or greater, such as 25 kHz or greater, such as 50 kHz or greater and including 100 KHz or greater. In certain instances, the frequency of pulsed irradiation by the light source ranges from 0.00001 kHz to 1000 kHz, such as from 0.00005 kHz to 900 kHz, such as from 0.0001 kHz to 800 kHz, such as from 0.0005 kHz to 700 kHz, such as from 0.001 kHz to 600 kHz, such as from 0.005 kHz to 500 kHz, such as from 0.01 kHz to 400 kHz, such as from 0.05 kHz to 300 kHz, such as from 0.1 kHz to 200 kHz and including from 1 kHz to 100 kHz. The duration of light irradiation for each light pulse (i.e., pulse width) may vary and may be 0.000001 ms or more, such as 0.000005 ms or more, such as 0.00001 ms or more, such as 0.00005 ms or more, such as 0.0001 ms or more, such as 0.0005 ms or more, such as 0.001 ms or more, such as 0.005 ms or more, such as 0.01 ms or more, such as 0.05 ms or more, such as 0.1 ms or more, such as 0.5 ms or more, such as 1 ms or more, such as 2 ms or more, such as 3 ms or more, such as 4 ms or more, such as 5 ms or more, such as 10 ms or more, such as 25 ms or more, such as 50 ms or more, such as 100 ms or more and including 500 ms or more. For example, the duration of light irradiation may range from 0.000001 ms to 1000 ms, such as from 0.000005 ms to 950 ms, such as from 0.00001 ms to 900 ms, such as from 0.00005 ms to 850 ms, such as from 0.0001 ms to 800 ms, such as from 0.0005 ms to 750 ms, such as from 0.001 ms to 700 ms, such as from 0.005 ms to 650 ms, such as from 0.01 ms to 600 ms, such as from 0.05 ms to 550 ms, such as from 0.1 ms to 500 ms, such as from 0.5 ms to 450 ms, such as from 1 ms to 400 ms, such as from 5 ms to 350 ms and including from 10 ms to 300 ms.

The light source may include laser and non-laser light sources (e.g., light emitting diodes). In certain embodiments, systems include a laser, such as a pulsed or continuous wave laser. For example, the laser may be a diode laser, such as an ultraviolet diode laser, a visible diode laser and a near-infrared diode laser. In other embodiments, the laser may be a helium-neon (HeNe) laser. In some instances, the laser is a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In other instances, the subject systems include a dye laser, such as a stilbene, coumarin or rhodamine laser. In yet other instances, lasers of interest include a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, the subject systems include a solid-state laser, such as a ruby laser, an Nd:YAG laser, NdCrYAG laser, Er:YAG laser, Nd:YLF laser, Nd:YVO$_4$ laser, Nd:YCa$_4$O(BO$_3$)$_3$ laser, Nd:YCOB laser, titanium sapphire laser, thulim YAG laser, ytterbium YAG laser, ytterbium$_2$O$_3$ laser or cerium doped lasers and combinations thereof.

The light source may be configured to output a specific wavelength, such as from 200 nm to 1500 nm, such as from 250 nm to 1250 nm, such as from 300 nm to 1000 nm, such as from 350 nm to 900 nm and including from 400 nm to 800 nm. In certain embodiments, the continuous wave light source emits light having a wavelength of 365 nm, 385 nm, 405 nm, 460 nm, 490 nm, 525 nm, 550 nm, 580 nm, 635 nm, 660 nm, 740 nm, 770 nm or 850 nm.

The light source may be positioned at any suitable distance from the flow stream, such as at a distance of 0.001 mm or more, such as 0.005 mm or more, such as 0.01 mm or more, such as 0.05 mm or more, such as 0.1 mm or more, such as 0.5 mm or more, such as 1 mm or more, such as 5 mm or more, such as 10 mm or more, such as 25 mm or more and including at a distance of 100 mm or more. The light source may be positioned at any suitable angle such as at an angle ranging from 10° to 90°, such as from 15° to 85°, such as from 20° to 80°, such as from 25° to 75° and including from 30° to 60°, for example at a 90° angle.

In embodiments, particle sorting systems include one or more photodetectors configured to detect light from the irradiated particles in one or more detection fields. By "detection field" is meant the region of the flow stream where light from the irradiated particles is detected (e.g., measured). Detection fields may vary depending on the properties of the flow stream being irradiated. In embodiments, the detection field may span 0.001 mm or more of the flow stream, such as 0.005 mm or more, such as 0.01 mm or more, such as 0.05 mm or more, such as 0.1 mm or more, such as 0.5 mm or more, such as 1 mm or more, such as 2 mm or more, such as 5 mm or more and including 10 mm or more of the flow stream.

Photodetectors may be any convenient light detecting protocol, including but not limited to photosensors or photodetectors, such as active-pixel sensors (APSs), avalanche photodiodes (APDs), quadrant photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, the photodetector is a photomultiplier tube, such as a photomultiplier tube having an active detecting surface area of each region that ranges from 0.01 $cm^2$ to 10 $cm^2$, such as from 0.05 $cm^2$ to 9 $cm^2$, such as from, such as from 0.1 $cm^2$ to 8 $cm^2$, such as from 0.5 $cm^2$ to 7 $cm^2$ and including from 1 $cm^2$ to 5 $cm^2$.

Depending on the number of detection fields being irradiated, the number of photodetectors in the subject systems may vary. For example, the subject systems may include one photodetector or more, such as two photodetectors or more, such as three photodetectors or more, such as four photodetectors or more, such as five photodetectors or more and including ten photodetectors or more. Where systems include more than one photodetector for detecting light from irradiated particles in the flow stream, each photodetector may be oriented with respect to the other (as referenced in an X-Y plane) at an angle ranging from 10° to 90°, such as from 15° to 85°, such as from 20° to 80°, such as from 25° to 75° and including from 30° to 60°. In certain embodiments, each photodetector is oriented orthogonally (as referenced in an X-Y plane) to each other. For example, where the subject systems include two photodetector, the first photodetector is oriented orthogonally (as referenced in an X-Y plane) to the second photodetector.

The photodetectors of the light detection system may be configured to measure light at one or more wavelengths, such as at 2 or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring light from particles in the flow stream at 400 or more different wavelengths. Light may be measured continuously or in discrete intervals. In some instances, detectors of interest are configured to take measurements of the light continuously. In other instances, detectors of interest are configured to take measurements in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval.

The photodetectors may be configured to take measurements of the light from the flow stream one or more times during each discrete time interval, such as 2 or more times, such as 3 or more times, such as 5 or more times and including 10 or more times. In certain embodiments, the light from the flow stream is measured by the photodetector 2 or more times, with the data in certain instances being averaged.

The photodetector may be positioned at any suitable distance from the flow stream. For example, the photodetector may be positioned 0.01 mm or more from the flow stream, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more from the flow stream. In some embodiments, the photodetector is positioned at an angle with respect to the flow stream axis. For example, the photodetector may be positioned at an angle with respect to the axis of the flow stream which ranges from 10° to 90°, such as from 15° to 85°, such as from 20° to 80°, such as from 25° to 75° and including from 30° to 60°. In certain embodiments, the photodetector is positioned at a 90° angle with respect to the axis of the flow stream.

As summarized above, systems include a support stage operationally coupled to the one or more photodetectors where the subject systems include a closed-loop feedback position encoder that is configured to adjust a position of the support stage in the X-Y plane in response to a data signal generated by the photodetector. In embodiments, photodetectors are configured to generate data signals in response to light from the flow stream (e.g., irradiated particles in the flow stream). In some embodiments, the position encoder is a negative feedback closed-loop position encoder. In other embodiments, the position encoder is a positive feedback closed-loop position encoder.

In some embodiments, the position encoder is configured to generate a data signal that includes the position of the support stage in the X-Y plane. In some instances, the position encoder is configured to determine whether the support stage is at a predetermined positioned in the X-Y plane (i.e., is in the desired position in the X-Y plane). For example, the position encoder may be configured to determine that the support stage is at a position that is 0.00001 µm or more away from a predetermined position in the X-Y plane, such as 0.00005 µm or more, such as 0.0001 µm or more, such as 0.0005 µm or more, such as 0.001 µm or more, such as 0.005 µm or more, such as 0.01 µm or more, such as 0.05 µm or more, such as 0.1 µm or more, such as 0.5 µm or more, such as 1 µm or more, such as 2 µm or more, such as 3 µm or more, such as 4 µm or more, such as 5 µm or more, such as 6 µm or more, such as 7 µm or more, such as 8 µm or more, such as 9 µm or more and including where the position encoder is configured to determine that the support stage is 10 μm or more away from a predetermined position in the X-Y plane (i.e., from the desired position in the X-Y plane).

In some instances, the position encoder is configured to generate a position map of the support stage in the X-Y plane. In certain instances, the position encoder is configured to map the position of the support stage relative to a mapped position of the flow stream in the X-Y plane. In some embodiments, the position of the flow stream is mapped in the X-Y plane and the position encoder is configured to determine the distance of the support stage from the mapped position of the flow stream, such as where the position encoder is configured to determine that the support stage is at a position that is 0.00001 μm or more away from the mapped position of the flow stream in the X-Y plane, such as 0.00005 μm or more, such as 0.0001 μm or more, such as 0.0005 μm or more, such as 0.001 μm or more, such as 0.005 μm or more, such as 0.01 μm or more, such as 0.05 μm or more, such as 0.1 μm or more, such as 0.5 μm or more, such as 1 μm or more, such as 2 μm or more, such as 3 μm or more, such as 4 μm or more, such as 5 μm or more, such as 6 μm or more, such as 7 μm or more, such as 8 μm or more, such as 9 μm or more and including where the position encoder is configured to determine that the support stage is 10 μm or more away from the mapped position of the flow stream in the X-Y plane.

In some embodiments, the position encoder may be configured to generate a negative feedback signal indicating that the support stage is at a distance away from the desired position in the X-Y plane. For example, the position encoder may generate a negative feedback signal that the support stage is at a distance of 0.00001 μm or more away from the desired position in the X-Y plane, such as 0.00005 μm or more, such as 0.0001 μm or more, such as 0.0005 μm or more, such as 0.001 μm or more, such as 0.005 μm or more, such as 0.01 μm or more, such as 0.05 μm or more, such as 0.1 μm or more, such as 0.5 μm or more, such as 1 μm or more, such as 2 μm or more, such as 3 μm or more, such as 4 μm or more, such as 5 μm or more, such as 6 μm or more, such as 7 μm or more, such as 8 μm or more, such as 9 μm or more and including where the position encoder generates a negative feedback signal when the support stage is positioned at a distance that is 10 μm or more away from the desired position in the X-Y plane.

In some embodiments, the position encoder may be configured to generate a negative feedback signal when the distance between the support stage and the desired position in the X-Y plane exceeds a predetermined threshold. For example, the position encoder may generate a negative feedback signal when the predetermined threshold distance is exceeded by 0.001% or more, such as 0.005% or more, such as 0.01% or more, such as 0.05% or more, such as 0.1% or more, such as 0.5% or more, such as 1% or more, such as 2% or more, such as 3% or more, such as 4% or more, such as 5% or more, such as 10% or more, such as 15% or more, such as 20% or more, such as 25% or more and including when the predetermined threshold distance is exceeded by 50% or more. In certain instances, the position encoder generates a negative feedback signal when the predetermined threshold distance is exceeded by 0.00001 μm or more in the X-Y plane, such as 0.00005 μm or more, such as 0.0001 μm or more, such as 0.0005 μm or more, such as 0.001 μm or more, such as 0.005 μm or more, such as 0.01 μm or more, such as 0.05 μm or more, such as 0.1 μm or more, such as 0.5 μm or more, such as 1 μm or more, such as 2 μm or more, such as 3 μm or more, such as 4 μm or more, such as 5 μm or more, such as 6 μm or more, such as 7 μm or more, such as 8 μm or more, such as 9 μm or more and including where a negative feedback signal is generated when the predetermined threshold distance is exceeded by 10 μm or more.

In some embodiments, the position encoder is configured to align the support stage with the flow stream. In some instances, aligning the support stage with the flow stream includes mapping the position of the droplets of the flow stream in an X-Y plane, mapping the position of the support stage in the X-Y plane and matching the position of the support stage with the position of the droplets of the flow stream in the X-Y plane. In certain instances, the position encoder is configured to generate a negative feedback signal when the support stage is misaligned with the flow stream. For example, the position encoder may be configured to generate a negative feedback signal when the support stage is misaligned with the flow stream in the X-Y plane by 0.00001 μm or more in the X-Y plane, such as 0.00005 μm or more, such as 0.0001 μm or more, such as 0.0005 μm or more, such as 0.001 μm or more, such as 0.005 μm or more, such as 0.01 μm or more, such as 0.05 μm or more, such as 0.1 μm or more, such as 0.5 μm or more, such as 1 μm or more, such as 2 μm or more, such as 3 μm or more, such as 4 μm or more, such as 5 μm or more, such as 6 μm or more, such as 7 μm or more, such as 8 μm or more, such as 9 μm or more and including where a negative feedback signal is generated when the support stage is misaligned with the flow stream in the X-Y plane by 10 μm or more.

As described above, support stages are in some embodiments configured to collect particles from the flow stream. In some instances, particles are collected into containers on the support stage positioned downstream from deflector plates where the flow stream droplets have been separated based on charge (e.g., positive, negative and neutral). For example, the deflector plates may include those described in U.S. Patent Publication No. 2017/0299493, filed on Mar. 28, 2017, the disclosure of which is incorporated herein by reference. In these instances, the position encoder is configures to generate a data signal corresponding to the spatial positions of the flow streams of the positive, negative and neutral particles. In some instances, the position of the flow stream in the X-Y plane is compared to the position of the flow stream before entering the deflector plates to determine the deviation due to the effects of the deflector plates. In these embodiments, the position encoder may generate a distinct data signal corresponding to the position of the flow stream of neutral particles, the flow stream of negative particles and the flow stream of positive particles, or any combination thereof. In one example, the position encoder generates a data signal which corresponds to the flow stream position of neutral particles after deflection by the deflector plates. In another example, the position encoder generates a data signal which corresponds to the flow stream position of negative particles after deflection by the deflector plates. In yet another example, the position encoder generates a data signal which corresponds to the flow stream position of positive particles coming from the deflector plates. In still another example, the position encoder generates a data signal which corresponds to the flow stream positions of the positive particles, the negative particles and the neutral particles.

In some embodiments, the position encoder is configured to adjust the position of the support stage in an X-Y plane so as to optimize collection of components of the flow stream. In some instances, the position encoder adjusts the position of the support stage to optimize collection of components of the flow stream in response to a negative feedback data signal as described above. In some embodiments, the position encoder adjusts the position of the support stage in an X-Y plane in response to a data signal corresponding to the spatial position of the flow stream. For example, optimizing collection may include reducing the number of flow stream particles not collected by one or more containers (as described in greater detail below) on the support stage due to misalignment of the flow stream with the collection containers. For example, the position encoder may be configured to adjust the position of the support stage to increase the amount of particles collected by 5% or more as compared to a container on a support stage not adjusted in response to the data signal, such as by 10% or more, such as 15% or more, such as 20% or more, such as 25% or more, such as 35% or more, such as 50% or more, such as 75% or more, such as 90% or more, such as 95% or more and including by 99% or more. Put another way, the position encoder in certain instances automatically aligns the position of the support stage in response to a data signal corresponding to the spatial position of the flow stream so that the number of particles missed by the container due to misalignment is decreased by 5% or more as compared to a container on a support stage not adjusted in response to the data signal, such as by 10% or more, such as 15% or more, such as 20% or more, such as 25% or more, such as 35% or more, such as 50% or more, such as 75% or more, such as 90% or more, such as 95% or more and including by 99% or more.

In some embodiments, adjustments to the position of the support stage by the position encoder, such as in response to a negative feedback data signal, increases the purity of the sample particles collected from the flow stream. For example, the purity of the sample particles may be increased by 5% or more as compared to a container on a support stage not adjusted in response to the data signal, such as by 10% or more, such as 15% or more, such as 20% or more, such as 25% or more, such as 35% or more, such as 50% or more, such as 75% or more, such as 90% or more, such as 95% or more and including by 99% or more.

In some instances, the position encoder is configured to generate a data signal that includes the velocity of support stage movement in the X-Y plane. For example, the position encoder may generate a data signal that includes a range of velocities of support stage movement in the X-Y plane. In certain instances, the position encoder is configured to generate a negative feedback data signal that the support stage velocity is less than a predetermined threshold velocity. For example, a negative feedback data signal may be generated by the position encoder when the support stage velocity is less than the predetermined threshold by 0.01% or more, such as by 0.05% or more, such as by 0.1% or more, such as by 0.5% or more, such as by 1% or more, such as by 2% or more, such as by 3% or more, such as by 4% or more, such as by 5% or more, such as by 6% or more, such as by 7% or more, such as by 8% or more, such as by 9% or more, such as by 10% or more, such as by 20% or more and including where the position encoder is configured to generate a negative feedback data signal when the support stage velocity is less than the predetermined threshold by 25% or more.

In some instances, the position encoder is configured to generate a data signal that includes the acceleration of support stage movement in the X-Y plane. For example, the position encoder may generate a data signal that includes a range of accelerations of support stage movement in the X-Y plane. In certain instances, the position encoder is configured to generate a negative feedback data signal that the support stage acceleration is less than a predetermined threshold acceleration. For example, a negative feedback data signal may be generated by the position encoder when the support stage acceleration is less than the predetermined threshold by 0.01% or more, such as by 0.05% or more, such as by 0.1% or more, such as by 0.5% or more, such as by 1% or more, such as by 2% or more, such as by 3% or more, such as by 4% or more, such as by 5% or more, such as by 6% or more, such as by 7% or more, such as by 8% or more, such as by 9% or more, such as by 10% or more, such as by 20% or more and including where the position encoder is configured to generate a negative feedback data signal when the support stage acceleration is less than the predetermined threshold by 25% or more.

The position encoder may be any convenient position sensing protocol which identifies the spatial position of the support stage in the X-Y plane, including but not limited to mechanical, optical, magnetic and electromagnetic position encoders. In certain instances, the closed-loop feedback position encoder includes a magnetic encoder. In some instances, the closed-loop feedback position encoder includes an incremental magnetic encoder. In some instances, the closed-loop feedback position encoder includes a continuous motion magnetic encoder. In some instances, the magnetic encoder detects rotation position information as changes of a magnetic field, converting these changes into electrical data signals. In some instances, the magnetic encoder includes a permanent magnet and a magnetic sensor component. For example, the permanent magnet may be attached to a rotating body such as a motor shaft, and the magnetic sensor is mounted onto a substrate (e.g., a printed circuit board) at a position where it receives the magnetic field generated by the permanent magnet. In these embodiments, when the permanent magnet attached to the motor shaft rotates, the direction of the magnetic field detected by the magnetic sensor changes which results in encoder detection of the rotational position and speed of the motor shaft. In some instances, the magnetic sensor outputs a voltage signal proportional to the strength of the magnetic field. In certain instances, the magnetic encoder includes a shaft-end configuration that combines a magnet that is magnetized in a radial direction and a magnetic sensor (e.g., a magnetic sensor having a Hall element) that detects the horizontal magnetic field strength and outputs voltage in response to the magnetic field strength.

In embodiments, the position of the support stage may be displaced in the subject systems by any convenient displacement protocol such as with a piezo motor, servomotor, brushless electric motor, brushed DC motor, micro-step drive motor, piezo geared translation device, such as those employing a stepper motor, leadscrew translation assembly, high resolution stepper motor, among other types of motors. In some embodiments, the support stage is configured with a servomotor. In some embodiments, the support stage is configured with a linear shaft servomotor. In some embodiments, the linear shaft servomotor is a continuous motion servomotor. In other embodiments, the linear shaft servomotor is a bidirectional motion servomotor. In some instances, the servomotor includes a rotary or linear actuator which provides for precise control of angular and linear position, velocity and acceleration of the support stage. In certain instances, servomotors of interest include a closed-loop servomechanism that uses position feedback to control motion and positioning. In some embodiments, the servomotor includes a brushed permanent magnet DC motor. In some embodiments, the servomotor includes an electronically commutated brushless motor. In some embodiments, the servomotor includes an AC induction motor, such as an induction motor the employs variable drive frequency. In certain embodiments, the servomotor includes a brushless AC motor with permanent magnets. In certain instances, the servomotor is incorporated into a housing with the position encoders described above.

In some embodiments, a support stage is positioned downstream from deflector plates (described in greater detail below) and includes one or more containers for collecting sorted particles such as cells that have been separated based on charge (i.e., positive, negative and neutral). In some instances, the support stage may include 2 containers or more, such as 3 containers or more, such as 4 containers or more, such as 5 containers or more, such as 6 containers or more, such as 7 containers or more, such as 8 containers or more, such as 9 containers or more, such as 10 containers or more, such a 11 containers or more and including 12 containers or more. In certain instances, the support stage includes a single container with partitioned compartments (e.g., a 6-well, 24-well, 48-well, 96-well, 128-well or 384-well plate) for collecting the sorted particles.

FIG. 1A depicts a schematic illustration of a support stage and position encoder according to certain embodiments. FIG. 1A illustrates two different views of the X-Y plane stage including position magnetic encoder, linear shaft motors, rail/slides and tray holder. The upper schematic of FIG. 1A presents an isometric-view and the lower schematic presents a side-view. As described above, in some embodiments the position encoder is a magnetic encoder. The magnetic encoder includes a magnetic encoder read head 101 which is operationally coupled to magnetic encoder scale 103. The magnetic encoder is configured to move along positions using linear shaft motor 102. The position encoder and tray holder 107 move along rails using axis guide slide 104. Tray holder 107 also includes a sample tray temperature controller 105 for maintaining or adjusting the temperature of sample container (e.g., microplate) 106 positioned on top of tray holder 107.

Figure 1B:
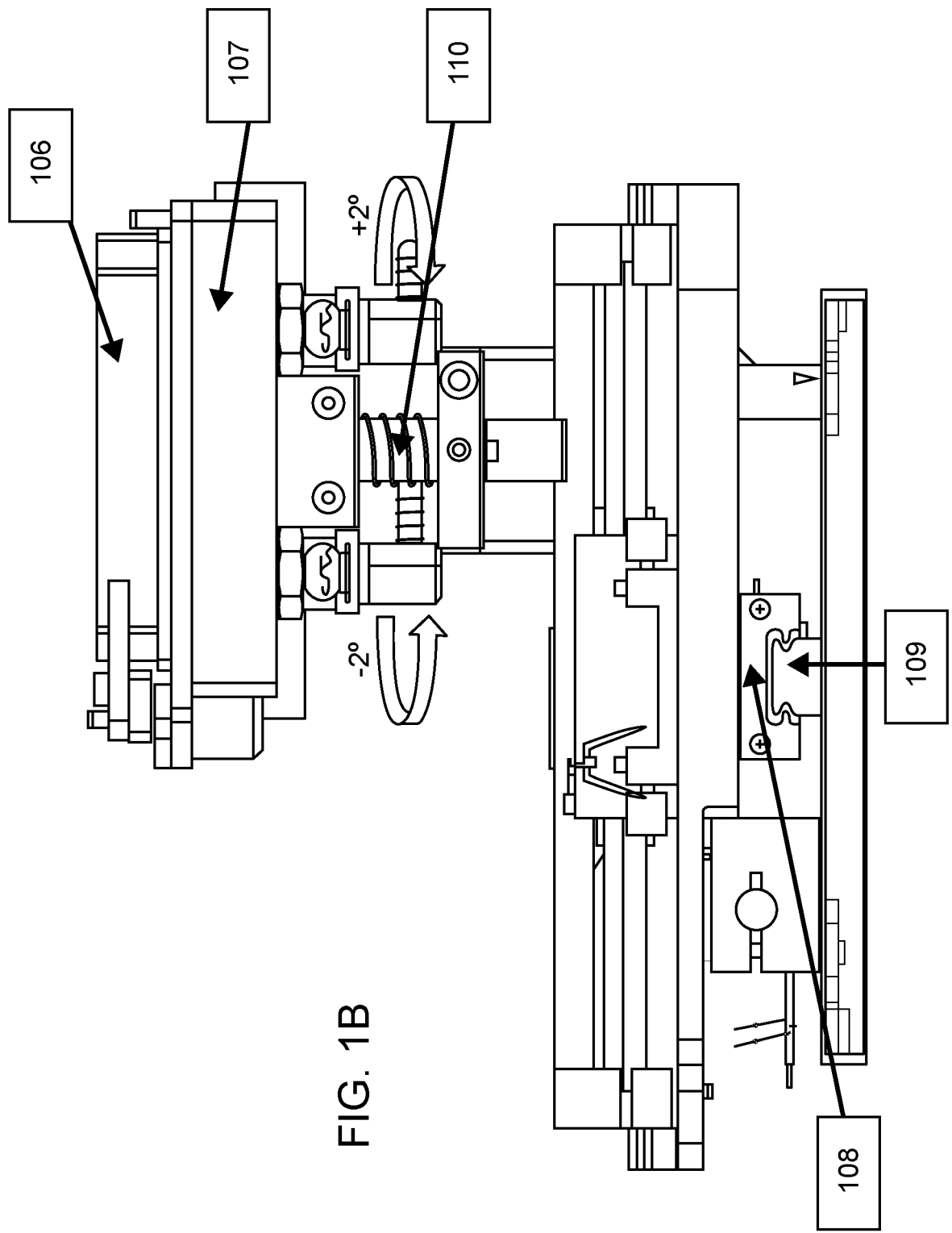
FIG. 1B depicts a schematic side-view illustration of an X-Y plane stage and position encoder, linear shaft motors, rail/slides and tray holder according to certain embodiments.

FIG. 1B depicts a schematic side-view illustration of a X-Y stage and position encoder according to certain embodiments. FIG. 1B depicts sample container (e.g. microplate) 106 positioned on top of tray holder 107 which is configured to rotate +/−2° with rotary assembly 110 for alignment calibration purposes. The position encoder is configured to control the tray holder position along rail 109 using guide slide 108.

Figure 3:
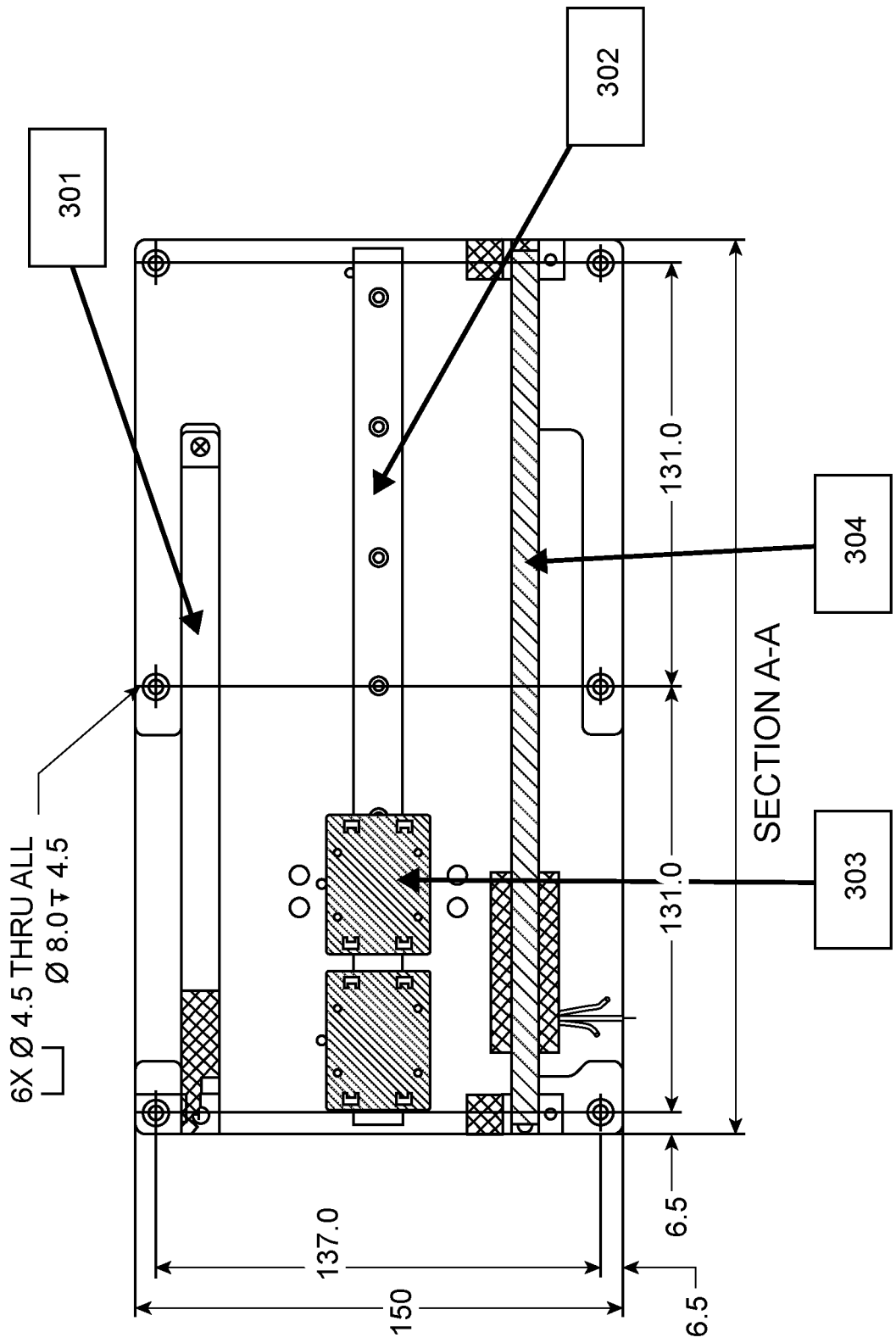
FIG. 3 depicts a schematic cross-sectional view illustration of a stage Y axis component as rail/slide, linear shaft motor, encoder scale as linear displacement device according to certain embodiments.

FIG. 2 depicts a schematic top-view illustration of an X-Y stage and linear shaft motors, position encoder according to certain embodiments. Tray holder chiller 205 includes sample microplate 204 for collecting sorted particles and is positioned using a linear shaft motor via magnetic encoder feedback control. The magnetic encoder includes a magnetic encoder read head 201 operationally coupled to magnetic encoder scale 202 for generating a data signal with precise positioning of tray holder 205. Tray holder 205 is displaced along guide rail 203 for Y axis and 206 for X axis. FIG. 3 depicts a schematic cross-sectional view illustration of stage Y axis bottom plate displacement device components as rail/slide, linear shaft motor and magnetic encoder according to certain embodiments. The magnetic encoder includes magnetic encoder scale 301 which is operationally coupled to encoder read head (not shown) for determining a precise position of the tray holder chiller with microplate. The tray holder is displaced along guide rails 302 using guide slide 303 using linear servo shaft motor 304 controlled via magnetic encoder close loop feedback.

In certain embodiments, the tray holder chiller includes a temperature controller such as for adjusting the temperature of a sample collection container. In some embodiments, the temperature controller is configured to increase temperature such as by 0.01% or more, such as by 0.05% or more, such as by 0.1% or more, such as by 0.5% or more, such as by 1% or more, such as by 2% or more, such as by 3% or more, such as by 4% or more, such as by 5% or more, such as by 6% or more, such as by 7% or more, such as by 8% or more, such as by 9% or more, such as by 10% or more, such as by 20% and including by 25% or more. For example, the temperature controller may be configured to increase temperature by 0.001° C. or more, such as by 0.005° C. or more, such as by 0.01° C. or more, such as by 0.05° C. or more, such as by 0.1° C. or more, such as by 0.5° C. or more, such as by 1° C. or more, such as by 2° C. or more, such as by 3° C. or more, such as by 4° C. or more, such as by 5° C. or more, such as by 10° C. or more and including by 15° C. or more. In some instances, the temperature controller is configured to decrease temperature, such as by 0.01% or more, such as by 0.05% or more, such as by 0.1% or more, such as by 0.5% or more, such as by 1% or more, such as by 2% or more, such as by 3% or more, such as by 4% or more, such as by 5% or more, such as by 6% or more, such as by 7% or more, such as by 8% or more, such as by 9% or more, such as by 10% or more, such as by 20% and including by 25% or more. For example, the temperature controller may be configured to decrease temperature by 0.001° C. or more, such as by 0.005° C. or more, such as by 0.01° C. or more, such as by 0.05° C. or more, such as by 0.1° C. or more, such as by 0.5° C. or more, such as by 1° C. or more, such as by 2° C. or more, such as by 3° C. or more, such as by 4° C. or more, such as by 5° C. or more, such as by 10° C. or more and including by 15° C. or more.

In certain embodiments, the temperature controller is configured to maintain the temperature of samples in the sample containers in a predetermined range, such as at a temperature which ranges from −25° C. to 100° C., such as from −20° C. to 90° C., such as from −15° C. to 80° C., such as from −10° C. to 70° C., such as from −5° C. to 60° C., such as from 0° C. to 50° C., such as from 48° C. to 40° C., such as from 45° C. to 37° C., such as from 42° C. to 34° C., such as from 4, such as from 10° C. to 30° C. and including from 15° C. to 25° C. In certain instances, the temperature controller is configured to maintain the temperature of samples in the sample containers in a range from −7° C. to 7° C., such as from −4° C. to 4° C., for example 4+/−3° C. In certain instances, the temperature controller is configured to maintain the temperature of samples in the sample containers in a range from 30° C. to 40° C., such as from 34° C. to 40° C., e.g., 37+/−3° C. In certain embodiments, the temperature controller is a closed-loop negative feedback temperature controller which generates a data signal when the temperature of the support stage exceeds or falls below a predetermined temperature threshold. For example, where the temperature of the support stage falls below a predetermined temperature threshold, the temperature controller may be configured to generate a data signal indicating that the temperature needs to be increased when the temperature measured by the temperature controller falls below a temperature threshold by 0.001° C. or more, such as by 0.005° C. or more, such as by 0.01° C. or more, such as by 0.05° C. or more, such as by 0.1° C. or more, such as by 0.5° C. or more and including by 1° C. or more. In other instances, the temperature controller generates a data signal when the temperature of the support stage exceeds a predetermined temperature threshold and the data signal indicates that the temperature needs to be decreased (e.g., to prevent decomposition of samples in the sample container), such as by decreasing the temperature with temperature controller by 0.001° C. or more, such as by 0.005° C. or more, such as by 0.01° C. or more, such as by 0.05° C. or more, such as by 0.1° C. or more, such as by 0.5° C. or more and including by 1° C. or more.

In certain embodiments, the temperature controller is configured to adjust or maintain the temperature of samples present at specific sample collection containers. In some instances, the temperature controller is configured to determine that one or more of the sample containers positioned on the support stage needs a temperature adjustment. For example, the temperature controller is configured to determine that one or more sample wells of a microplate is in need of temperature adjustment. In these instances, the temperature controller adjusts the temperature of each specific sample collection container (e.g., each specific sample well), such as by increasing or decreasing the temperature by 0.001° C. or more, such as by 0.005° C. or more, such as by 0.01° C. or more, such as by 0.05° C. or more, such as by 0.1° C. or more, such as by 0.5° C. or more, such as by 1° C. or more, such as by 2° C. or more, such as by 3° C. or more, such as by 4° C. or more, such as by 5° C. or more, such as by 10° C. or more and including by 15° C. or more.

Any convenient temperature control protocol can be employed including but not limited to conduction, convection or radiation temperature controllers. In some instances, the temperature of the support stage is controlled with a heat exchanger such as a shell and tube heat exchanger, plate heat exchanger, plate and shell heat exchanger, an adiabatic wheel heat exchanger, a plate fin heat exchanger, a finned tube heat exchanger, a pillow plate heat exchanger, phase change exchangers, direct contact heat exchanger, microchannel heat exchangers, refrigerated air coils, fluidic coils, phase loop active thermal control systems, a helical coil heat exchanger, thermoelectric heaters and coolers among other types of temperature controllers.

In certain embodiments, systems further include a flow cell configured to propagate the sample in the flow stream. Any convenient flow cell which propagates a fluidic sample to a sample interrogation region may be employed, where in some embodiments, the flow cell includes a proximal cylindrical portion defining a longitudinal axis and a distal frustoconical portion which terminates in a flat surface having the orifice that is transverse to the longitudinal axis. The length of the proximal cylindrical portion (as measured along the longitudinal axis) may vary ranging from 1 mm to 15 mm, such as from 1.5 mm to 12.5 mm, such as from 2 mm to 10 mm, such as from 3 mm to 9 mm and including from 4 mm to 8 mm. The length of the distal frustoconical portion (as measured along the longitudinal axis) may also vary, ranging from 1 mm to 10 mm, such as from 2 mm to 9 mm, such as from 3 mm to 8 mm and including from 4 mm to 7 mm. The diameter of the of the flow cell nozzle chamber may vary, in some embodiments, ranging from 1 mm to 10 mm, such as from 2 mm to 9 mm, such as from 3 mm to 8 mm and including from 4 mm to 7 mm.

In certain instances, the flow cell does not include a cylindrical portion and the entire flow cell inner chamber is frustoconically shaped. In these embodiments, the length of the frustoconical inner chamber (as measured along the longitudinal axis transverse to the nozzle orifice), may range from 1 mm to 15 mm, such as from 1.5 mm to 12.5 mm, such as from 2 mm to 10 mm, such as from 3 mm to 9 mm and including from 4 mm to 8 mm. The diameter of the proximal portion of the frustoconical inner chamber may range from 1 mm to 10 mm, such as from 2 mm to 9 mm, such as from 3 mm to 8 mm and including from 4 mm to 7 mm.

In some embodiments, the sample flow stream emanates from an orifice at the distal end of the flow cell. Depending on the desired characteristics of the flow stream, the flow cell orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. In certain embodiments, flow cell of interest has a circular orifice. The size of the nozzle orifice may vary, in some embodiments ranging from 1 µm to 20000 µm, such as from 2 µm to 17500 µm, such as from 5 µm to 15000 µm, such as from 10 µm to 12500 µm, such as from 15 µm to 10000 µm, such as from 25 µm to 7500 µm, such as from 50 µm to 5000 µm, such as from 75 µm to 1000 µm, such as from 100 µm to 750 µm and including from 150 µm to 500 µm. In certain embodiments, the nozzle orifice is 100 µm.

In some embodiments, the flow cell includes a sample injection port configured to provide a sample to the flow cell. In embodiments, the sample injection system is configured to provide suitable flow of sample to the flow cell inner chamber. Depending on the desired characteristics of the flow stream, the rate of sample conveyed to the flow cell chamber by the sample injection port may be 1 µL/min or more, such as 2 µL/min or more, such as 3 µL/min or more, such as 5 µL/min or more, such as 10 L/min or more, such as 15 µL/min or more, such as 25 µL/min or more, such as 50 µL/min or more and including 100 µL/min or more, where in some instances the rate of sample conveyed to the flow cell chamber by the sample injection port is 1 µL/sec or more, such as 2 µL/sec or more, such as 3 µL/sec or more, such as 5 µL/sec or more, such as 10 µL/sec or more, such as 15 µL/sec or more, such as 25 µL/sec or more, such as 50 µL/sec or more and including 100 µL/sec or more.

The sample injection port may be an orifice positioned in a wall of the inner chamber or may be a conduit positioned at the proximal end of the inner chamber. Where the sample injection port is an orifice positioned in a wall of the inner chamber, the sample injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, etc., as well as irregular shapes, e.g., a parabolic bottom portion coupled to a planar top portion. In certain embodiments, the sample injection port has a circular orifice. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In certain instances, the sample injection port is a conduit positioned at a proximal end of the flow cell inner chamber. For example, the sample injection port may be a conduit positioned to have the orifice of the sample injection port in line with the flow cell orifice. Where the sample injection port is a conduit positioned in line with the flow cell orifice, the cross-sectional shape of the sample injection tube may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The orifice of the conduit may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm. The shape of the tip of the sample injection port may be the same or different from the cross-section shape of the sample injection tube. For example, the orifice of the sample injection port may include a beveled tip having a bevel angle ranging from 1° to 10°, such as from 2° to 9°, such as from 3° to 8°, such as from 4° to 7° and including a bevel angle of 5°.

In some embodiments, the flow cell also includes a sheath fluid injection port configured to provide a sheath fluid to the flow cell. In embodiments, the sheath fluid injection system is configured to provide a flow of sheath fluid to the flow cell inner chamber, for example in conjunction with the sample to produce a laminated flow stream of sheath fluid surrounding the sample flow stream. Depending on the desired characteristics of the flow stream, the rate of sheath fluid conveyed to the flow cell chamber by the may be 25 µL/sec or more, such as 50 µL/sec or more, such as 75 µL/sec or more, such as 100 µL/sec or more, such as 250 µL/sec or more, such as 500 µL/sec or more, such as 750 µL/sec or more, such as 1000 µL/sec or more and including 2500 µL/sec or more.

In some embodiments, the sheath fluid injection port is an orifice positioned in a wall of the inner chamber. The sheath fluid injection port orifice may be any suitable shape where cross-sectional shapes of interest include, but are not limited to: rectilinear cross sectional shapes, e.g., squares, rectangles, trapezoids, triangles, hexagons, etc., curvilinear cross-sectional shapes, e.g., circles, ovals, as well as irregular shapes, e.g., a parabolic bottom portion coupled to a planar top portion. The size of the sample injection port orifice may vary depending on shape, in certain instances, having an opening ranging from 0.1 mm to 5.0 mm, e.g., 0.2 to 3.0 mm, e.g., 0.5 mm to 2.5 mm, such as from 0.75 mm to 2.25 mm, such as from 1 mm to 2 mm and including from 1.25 mm to 1.75 mm, for example 1.5 mm.

In some embodiments, systems further include a pump in fluid communication with the flow cell to propagate the flow stream through the flow cell. Any convenient fluid pump protocol may be employed to control the flow of the flow stream through the flow cell. In certain instances, systems include a peristaltic pump, such as a peristaltic pump having a pulse damper. The pump in the subject systems is configured to convey fluid through the flow cell at a rate suitable for detecting light from the sample in the flow stream. In some instances, the rate of sample flow in the flow cell is 1 µL/min (microliter per minute) or more, such as 2 µL/min or more, such as 3 µL/min or more, such as 5 µL/min or more, such as 10 µL/min or more, such as 25 µL/min or more, such as 50 µL/min or more, such as 75 µL/min or more, such as 100 µL/min or more, such as 250 µL/min or more, such as 500 µL/min or more, such as 750 µL/min or more and including 1000 µL/min or more. For example, the system may include a pump that is configured to flow sample through the flow cell at a rate that ranges from 1 µL/min to 500 µL/min, such as from 1 µL/min to 250 µL/min, such as from 1 µL/min to 100 µL/min, such as from 2 µL/min to 90 µL/min, such as from 3 µL/min to 80 µL/min, such as from 4 µL/min to 70 µL/min, such as from 5 µL/min to 60 µL/min and including rom 10 µL/min to 50 µL/min. In certain embodiments, the flow rate of the flow stream is from 5 µL/min to 6 µL/min.

In certain embodiments, the subject systems are flow cytometric systems. Suitable flow cytometry systems may include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem.* January; 49 (pt 1): 17-28; Linden, et. al., *Semin Throm Hemost.* 2004 October; 30 (5): 502-11; Alison, et al. *J Pathol,* 2010 December; 222(4): 335-344; and Herbig, et al. (2007) *Crit Rev Ther Drug Carrier Syst.* 24(3): 203-255; the disclosures of which are incorporated herein by reference. In certain instances, flow cytometry systems of interest include BD Biosciences FACSCanto™ II flow cytometer, BD Accuri™ flow cytometer, BD Biosciences FACSCelesta™ flow cytometer, BD Biosciences FACSLyric™ flow cytometer, BD Biosciences FACSVerse™ flow cytometer, BD Biosciences FACSymphony™ flow cytometer BD Biosciences LSRFortessa™ flow cytometer, BD Biosciences LSRFortess™ X-20 flow cytometer and BD Biosciences FACSCalibur™ cell sorter, a BD Biosciences FACSCount™ cell sorter, BD Biosciences FACSLyric™ cell sorter and BD Biosciences Via™ cell sorter BD Biosciences Influx™ cell sorter, BD Biosciences Jazz™ cell sorter, BD Biosciences Aria™ cell sorters and BD Biosciences FACSMelody™ cell sorter, or the like.

In some embodiments, the subject systems are particle sorting systems, such those described in U.S. Pat. Nos. 10,006,852; 9,952,076; 9,933,341; 9,784,661; 9,726,527; 9,453,789; 9,200,334; 9,097,640; 9,095,494; 9,092,034; 8,975,595; 8,753,573; 8,233,146; 8,140,300; 7,544,326; 7,201,875; 7,129,505; 6,821,740; 6,813,017; 6,809,804; 6,372,506; 5,700,692; 5,643,796; 5,627,040; 5,620,842; 5,602,039; the disclosure of which are herein incorporated by reference in their entirety.

In some embodiments, the subject systems are particle sorting systems that are configured to sort particles with an enclosed particle sorting module, such as those described in U.S. Patent Publication No. 2017/0299493, the disclosure of which is incorporated herein by reference. In certain embodiments, particles (e.g., cells) of the sample are sorted using a sort decision module having a plurality of sort decision units, such as those described in U.S. Patent Publication No. 2020/0256781, the disclosure of which is incorporated herein by reference. In some embodiments, the subject systems include a particle sorting module having deflector plates, such as described in U.S. Patent Publication No. 2017/0299493, filed on Mar. 28, 2017, the disclosure of which is incorporated herein by reference.

In certain instances, systems of interest are flow cytometry systems configured for imaging particles in a flow stream by fluorescence imaging using radiofrequency tagged emission (FIRE), such as those described in Diebold, et al. *Nature Photonics* Vol. 7(10); 806-810 (2013) as well as described in U.S. Pat. Nos. 9,423,353; 9,784,661 and 10,006,852 and U.S. Patent Publication Nos. 2017/0133857 and 2017/0350803, the disclosures of which are herein incorporated by reference.

In some embodiments, systems are particle analyzers where the particle analysis system 401 (FIG. 4A) can be used to analyze and characterize particles, with or without physically sorting the particles into collection vessels. FIG. 4A shows a functional block diagram of a particle analysis system for computational based sample analysis and particle characterization. In some embodiments, the particle analysis system 401 is a flow system. The particle analysis system 401 shown in FIG. 4A can be configured to perform, in whole or in part, the methods described herein such as. The particle analysis system 401 includes a fluidics system 402.

The fluidics system 402 can include or be coupled with a sample tube 405 and a moving fluid column within the sample tube in which particles 403 (e.g. cells) of a sample move along a common sample path 409.

The particle analysis system 401 includes a detection system 404 configured to collect a signal from each particle as it passes one or more detection stations along the common sample path. A detection station 408 generally refers to a monitored area 407 of the common sample path. Detection can, in some implementations, include detecting light or one or more other properties of the particles 403 as they pass through a monitored area 407. In FIG. 4A, one detection station 408 with one monitored area 407 is shown. Some implementations of the particle analysis system 401 can include multiple detection stations. Furthermore, some detection stations can monitor more than one area.

Each signal is assigned a signal value to form a data point for each particle. As described above, this data can be referred to as event data. The data point can be a multidimensional data point including values for respective properties measured for a particle. The detection system 404 is configured to collect a succession of such data points in a first time interval.

The particle analysis system 401 can also include a control system 306. The control system 406 can include one or more processors, an amplitude control circuit and/or a frequency control circuit. The control system shown can be operationally associated with the fluidics system 402. The control system can be configured to generate a calculated signal frequency for at least a portion of the first time interval based on a Poisson distribution and the number of data points collected by the detection system 404 during the first time interval. The control system 406 can be further configured to generate an experimental signal frequency based on the number of data points in the portion of the first time interval. The control system 406 can additionally compare the experimental signal frequency with that of a calculated signal frequency or a predetermined signal frequency.

Figure 4B:
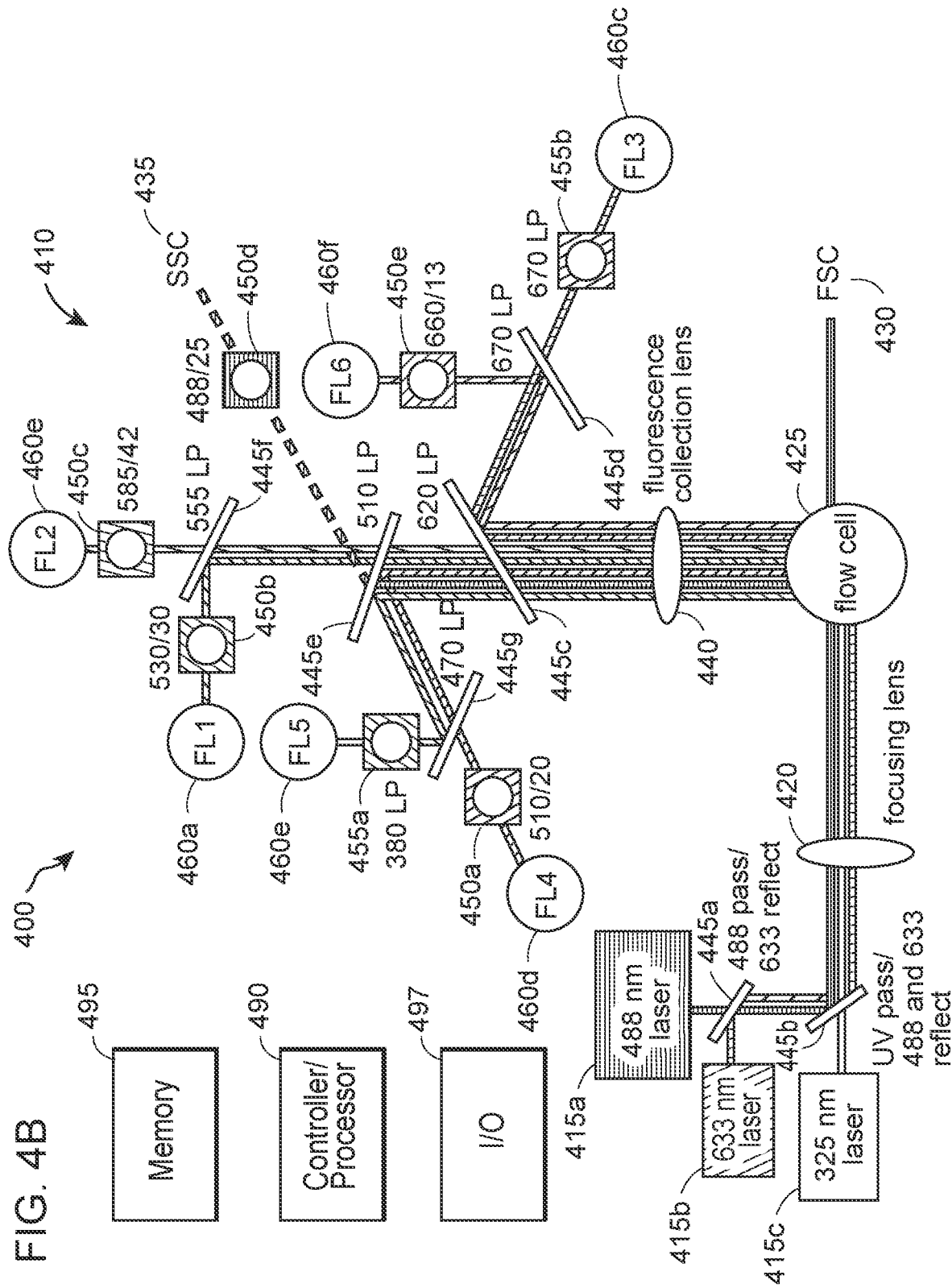
FIG. 4B depicts a flow cytometer according to certain embodiments.

In some embodiments, an example of a flow cytometry system is shown in FIG. 4B. System 400 includes a flow cytometer 410, a controller/processor 490 and a memory 495. The flow cytometer 410 includes one or more excitation lasers 415a-415c, a focusing lens 420, a flow chamber 425, a forward scatter detector 430, a side scatter detector 435, a fluorescence collection lens 440, one or more beam splitters 445a-445g, one or more bandpass filters 450a-450e, one or more longpass ("LP") filters 455a-455b, and one or more fluorescent detectors 460a-460f.

The excitation lasers 115a-c emit light in the form of a laser beam. The wavelengths of the laser beams emitted from excitation lasers 415a-415c are 488 nm, 633 nm, and 325 nm, respectively, in the example system of FIG. 4B. The laser beams are first directed through one or more of beam splitters 445a and 445b. Beam splitter 445a transmits light at 488 nm and reflects light at 633 nm. Beam splitter 445b transmits UV light (light with a wavelength in the range of 10 to 400 nm) and reflects light at 488 nm and 633 nm.

The laser beams are then directed to a focusing lens 420, which focuses the beams onto the portion of a fluid stream where particles of a sample are located, within the flow chamber 425. The flow chamber is part of a fluidics system which directs particles, typically one at a time, in a stream to the focused laser beam for interrogation. The flow chamber can comprise a flow cell in a benchtop cytometer or a nozzle tip in a stream-in-air cytometer.

The light from the laser beam(s) interacts with the particles in the sample by diffraction, refraction, reflection, scattering, and absorption with re-emission at various different wavelengths depending on the characteristics of the particle such as its size, internal structure, and the presence of one or more fluorescent molecules attached to or naturally present on or in the particle. The fluorescence emissions as well as the diffracted light, refracted light, reflected light, and scattered light may be routed to one or more of the forward scatter detector 430, the side scatter detector 435, and the one or more fluorescent detectors 460a-460f through one or more of the beam splitters 445a-445g, the bandpass filters 450a-450e, the longpass filters 455a-455b, and the fluorescence collection lens 440.

The fluorescence collection lens 440 collects light emitted from the particle-laser beam interaction and routes that light towards one or more beam splitters and filters. Bandpass filters, such as bandpass filters 450a-450e, allow a narrow range of wavelengths to pass through the filter. For example, bandpass filter 450a is a 510/20 filter. The first number represents the center of a spectral band. The second number provides a range of the spectral band. Thus, a 510/20 filter extends 10 nm on each side of the center of the spectral band, or from 500 nm to 520 nm. Shortpass filters transmit wavelengths of light equal to or shorter than a specified wavelength. Longpass filters, such as longpass filters 455a-455b, transmit wavelengths of light equal to or longer than a specified wavelength of light. For example, longpass filter 455a, which is a 670 nm longpass filter, transmits light equal to or longer than 670 nm. Filters are often selected to optimize the specificity of a detector for a particular fluorescent dye. The filters can be configured so that the spectral band of light transmitted to the detector is close to the emission peak of a fluorescent dye.

Beam splitters direct light of different wavelengths in different directions. Beam splitters can be characterized by filter properties such as shortpass and longpass. For example, beam splitter 445g is a 620 SP beam splitter, meaning that the beam splitter 445g transmits wavelengths of light that are 620 nm or shorter and reflects wavelengths of light that are longer than 620 nm in a different direction. In one embodiment, the beam splitters 445a-445g can comprise optical mirrors, such as dichroic mirrors.

The forward scatter detector 430 is positioned slightly off axis from the direct beam through the flow cell and is configured to detect diffracted light, the excitation light that travels through or around the particle in mostly a forward direction. The intensity of the light detected by the forward scatter detector is dependent on the overall size of the particle. The forward scatter detector can include a photodiode. The side scatter detector 435 is configured to detect refracted and reflected light from the surfaces and internal structures of the particle, and tends to increase with increasing particle complexity of structure. The fluorescence emissions from fluorescent molecules associated with the particle can be detected by the one or more fluorescent detectors 460a-460f. The side scatter detector 435 and fluorescent detectors can include photomultiplier tubes. The signals detected at the forward scatter detector 430, the side scatter detector 435 and the fluorescent detectors can be converted to electronic signals (voltages) by the detectors. This data can provide information about the sample.

One of skill in the art will recognize that a flow cytometer in accordance with an embodiment of the present invention is not limited to the flow cytometer depicted in FIG. 4B, but can include any flow cytometer known in the art. For example, a flow cytometer may have any number of lasers, beam splitters, filters, and detectors at various wavelengths and in various different configurations.

In operation, cytometer operation is controlled by a controller/processor 490, and the measurement data from the detectors can be stored in the memory 495 and processed by the controller/processor 490. Although not shown explicitly, the controller/processor 190 is coupled to the detectors to receive the output signals therefrom, and may also be coupled to electrical and electromechanical components of the flow cytometer 400 to control the lasers, fluid flow parameters, and the like. Input/output (I/O) capabilities 497 may be provided also in the system. The memory 495, controller/processor 490, and I/O 497 may be entirely provided as an integral part of the flow cytometer 410. In such an embodiment, a display may also form part of the I/O capabilities 497 for presenting experimental data to users of the cytometer 400. Alternatively, some or all of the memory 495 and controller/processor 490 and I/O capabilities may be part of one or more external devices such as a general purpose computer. In some embodiments, some or all of the memory 495 and controller/processor 490 can be in wireless or wired communication with the cytometer 410. The controller/processor 490 in conjunction with the memory 495 and the I/O 497 can be configured to perform various functions related to the preparation and analysis of a flow cytometer experiment.

The system illustrated in FIG. 4B includes six different detectors that detect fluorescent light in six different wavelength bands (which may be referred to herein as a "filter window" for a given detector) as defined by the configuration of filters and/or splitters in the beam path from the flow cell 425 to each detector. Different fluorescent molecules used for a flow cytometer experiment will emit light in their own characteristic wavelength bands. The particular fluorescent labels used for an experiment and their associated fluorescent emission bands may be selected to generally coincide with the filter windows of the detectors. However, as more detectors are provided, and more labels are utilized, perfect correspondence between filter windows and fluorescent emission spectra is not possible. It is generally true that although the peak of the emission spectra of a particular fluorescent molecule may lie within the filter window of one particular detector, some of the emission spectra of that label will also overlap the filter windows of one or more other detectors. This may be referred to as spillover. The I/O 497 can be configured to receive data regarding a flow cytometer experiment having a panel of fluorescent labels and a plurality of cell populations having a plurality of markers, each cell population having a subset of the plurality of markers. The I/O 497 can also be configured to receive biological data assigning one or more markers to one or more cell populations, marker density data, emission spectrum data, data assigning labels to one or more markers, and cytometer configuration data. Flow cytometer experiment data, such as label spectral characteristics and flow cytometer configuration data can also be stored in the memory 495. The controller/processor 490 can be configured to evaluate one or more assignments of labels to markers.

Figure 5:
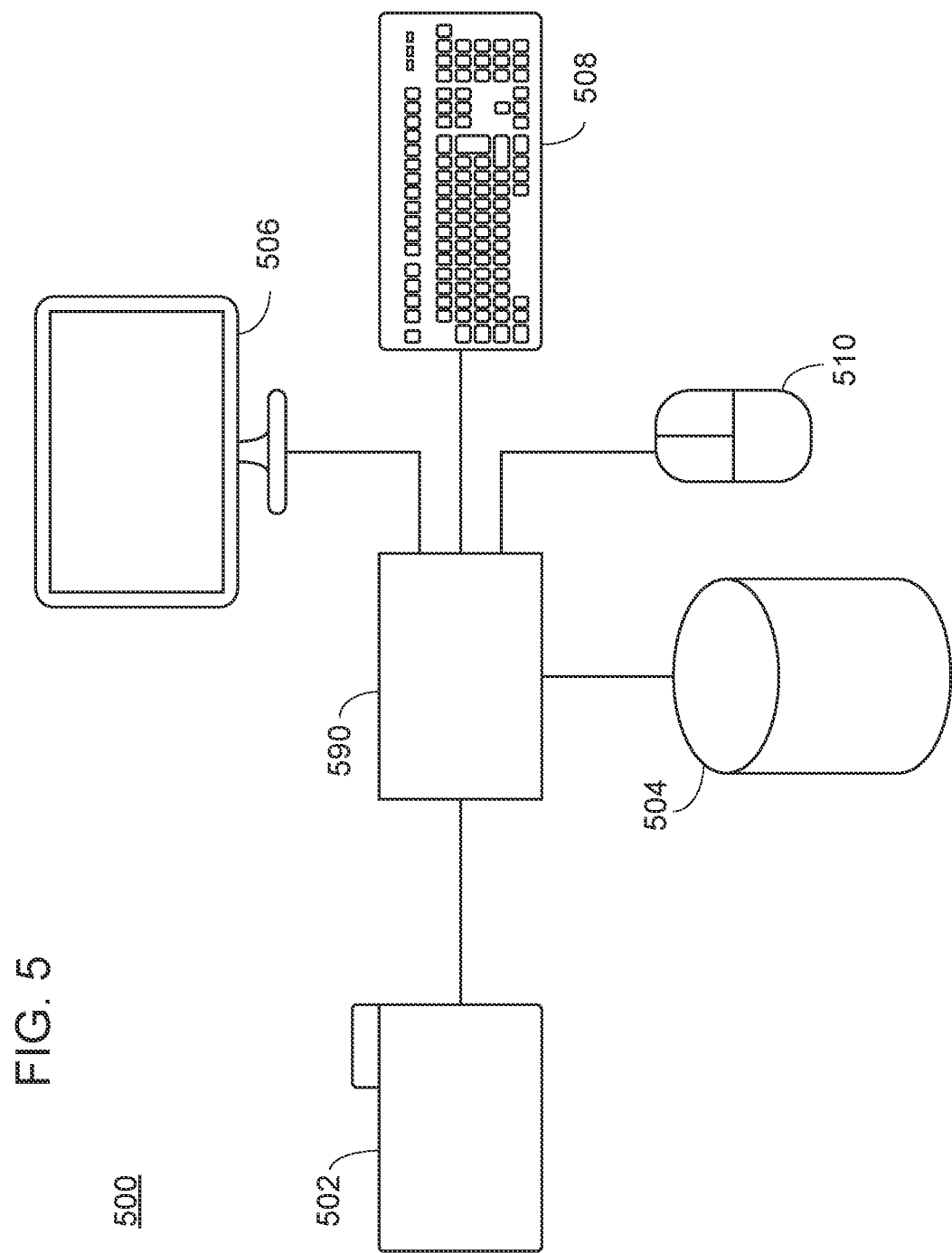
FIG. 5 depicts a functional block diagram for one example of a particle analyzer control system according to certain embodiments.

FIG. 5 shows a functional block diagram for one example of a particle analyzer control system, such as an analytics controller 500, for analyzing and displaying biological events. An analytics controller 500 can be configured to implement a variety of processes for controlling graphic display of biological events.

A particle analyzer or sorting system 502 can be configured to acquire biological event data. For example, a flow cytometer can generate flow cytometric event data. The particle analyzer 502 can be configured to provide biological event data to the analytics controller 500. In some embodiments, the particle analyzer includes the Fourier transform module configured to transform the interferograms generated by the photodetector into spectral data signals by one or more of a Fourier transform, a discrete Fourier transform and a short-time Fourier transform. A data communication channel can be included between the particle analyzer or sorting system 502 and the analytics controller 500. The biological event data can be provided to the analytics controller 500 via the data communication channel.

The analytics controller 500 can be configured to receive biological event data from the particle analyzer or sorting system 502. The biological event data received from the particle analyzer or sorting system 502 can include flow cytometric event data. The analytics controller 500 can be configured to provide a graphical display including a first plot of biological event data to a display device 506. The analytics controller 500 can be further configured to render a region of interest as a gate around a population of biological event data shown by the display device 506, overlaid upon the first plot, for example. In some embodiments, the gate can be a logical combination of one or more graphical regions of interest drawn upon a single parameter histogram or bivariate plot. In some embodiments, the display can be used to display particle parameters or saturated detector data.

The analytics controller 500 can be further configured to display the biological event data on the display device 506 within the gate differently from other events in the biological event data outside of the gate. For example, the analytics controller 500 can be configured to render the color of biological event data contained within the gate to be distinct from the color of biological event data outside of the gate. The display device 506 can be implemented as a monitor, a tablet computer, a smartphone, or other electronic device configured to present graphical interfaces.

The analytics controller 500 can be configured to receive a gate selection signal identifying the gate from a first input device. For example, the first input device can be implemented as a mouse 510. The mouse 510 can initiate a gate selection signal to the analytics controller 500 identifying the gate to be displayed on or manipulated via the display device 506 (e.g., by clicking on or in the desired gate when the cursor is positioned there). In some implementations, the first device can be implemented as the keyboard 508 or other means for providing an input signal to the analytics controller 500 such as a touchscreen, a stylus, an optical detector, or a voice recognition system. Some input devices can include multiple inputting functions. In such implementations, the inputting functions can each be considered an input device. For example, as shown in FIG. 5, the mouse 510 can include a right mouse button and a left mouse button, each of which can generate a triggering event.

The triggering event can cause the analytics controller 500 to alter the manner in which the data is displayed, which portions of the data is actually displayed on the display device 506, and/or provide input to further processing such as selection of a population of interest for particle sorting.

In some embodiments, the analytics controller 500 can be configured to detect when gate selection is initiated by the mouse 510. The analytics controller 500 can be further configured to automatically modify plot visualization to facilitate the gating process. The modification can be based on the specific distribution of biological event data received by the analytics controller 500.

The analytics controller 500 can be connected to a storage device 504. The storage device 504 can be configured to receive and store biological event data from the analytics controller 500. The storage device 504 can also be configured to receive and store flow cytometric event data from the analytics controller 500. The storage device 504 can be further configured to allow retrieval of biological event data, such as flow cytometric event data, by the analytics controller 500.

A display device 506 can be configured to receive display data from the analytics controller 500. The display data can comprise plots of biological event data and gates outlining sections of the plots. The display device 506 can be further configured to alter the information presented according to input received from the analytics controller 500 in conjunction with input from the particle analyzer 502, the storage device 504, the keyboard 508, and/or the mouse 510.

In some implementations, the analytics controller 500 can generate a user interface to receive example events for sorting. For example, the user interface can include a control for receiving example events or example images. The example events or images or an example gate can be provided prior to collection of event data for a sample, or based on an initial set of events for a portion of the sample.

Figure 6A:
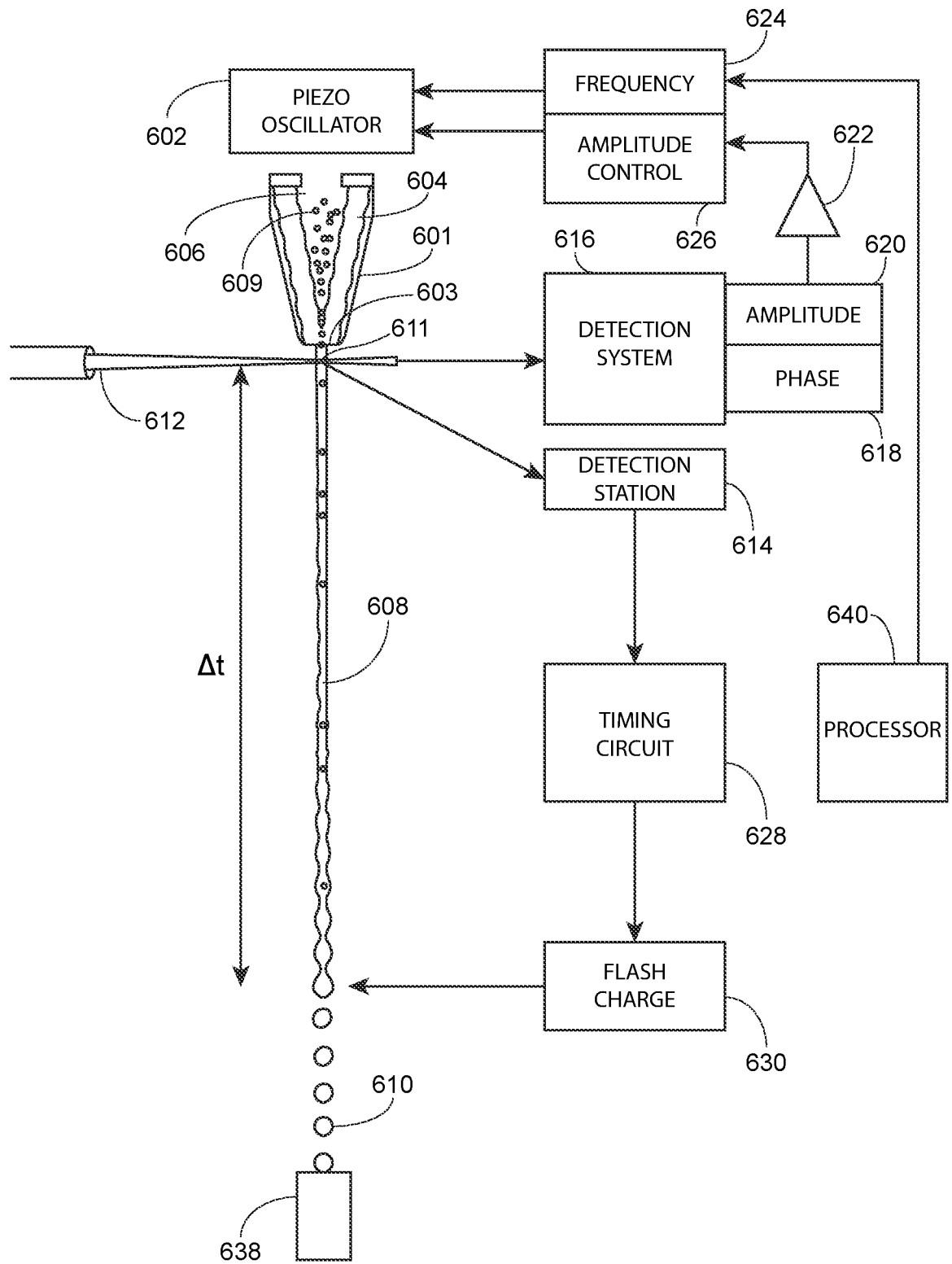
FIG. 6A depicts a schematic drawing of a particle sorter system according to certain embodiments.

FIG. 6A is a schematic drawing of a particle sorter system 600 (e.g., the particle analyzer or sorting system 502) in accordance with one embodiment presented herein. In some embodiments, the particle sorter system 600 is a cell sorter system. As shown in FIG. 6A, a drop formation transducer 602 (e.g., piezo-oscillator) is coupled to a fluid conduit 601, which can be coupled to, can include, or can be, a nozzle 603. Within the fluid conduit 601, sheath fluid 604 hydrodynamically focuses a sample fluid 606 comprising particles 609 into a moving fluid column 608 (e.g. a stream). Within the moving fluid column 608, particles 609 (e.g., cells) are lined up in single file to cross a monitored area 611 (e.g., where laser-stream intersect), irradiated by an irradiation source 612 (e.g., a laser). Vibration of the drop formation transducer 602 causes moving fluid column 608 to break into a plurality of drops 610, some of which contain particles 609.

In operation, a detection station 614 (e.g., an event detector) identifies when a particle of interest (or cell of interest) crosses the monitored area 611. Detection station 614 feeds into a timing circuit 628, which in turn feeds into a flash charge circuit 630. At a drop break off point, informed by a timed drop delay (Δt), a flash charge can be applied to the moving fluid column 608 such that a drop of interest carries a charge. The drop of interest can include one or more particles or cells to be sorted. The charged drop can then be sorted by activating deflection plates (not shown) to deflect the drop into a vessel such as a collection tube or a multi-well or microwell sample plate where a well or microwell can be associated with drops of particular interest. As shown in FIG. 6A, the drops can be collected in a drain receptacle 638.

A detection system 616 (e.g. a drop boundary detector) serves to automatically determine the phase of a drop drive signal when a particle of interest passes the monitored area 611. An exemplary drop boundary detector is described in U.S. Pat. No. 7,679,039, which is incorporated herein by reference in its entirety. The detection system 616 allows the instrument to accurately calculate the place of each detected particle in a drop. The detection system 616 can feed into an amplitude signal 620 and/or phase 618 signal, which in turn feeds (via amplifier 622) into an amplitude control circuit 626 and/or frequency control circuit 624. The amplitude control circuit 626 and/or frequency control circuit 624, in turn, controls the drop formation transducer 602. The amplitude control circuit 626 and/or frequency control circuit 624 can be included in a control system.

In some implementations, sort electronics (e.g., the detection system 616, the detection station 614 and a processor 640) can be coupled with a memory configured to store the detected events and a sort decision based thereon. The sort decision can be included in the event data for a particle. In some implementations, the detection system 616 and the detection station 614 can be implemented as a single detection unit or communicatively coupled such that an event measurement can be collected by one of the detection system 616 or the detection station 614 and provided to the non-collecting element.

Figure 6B:
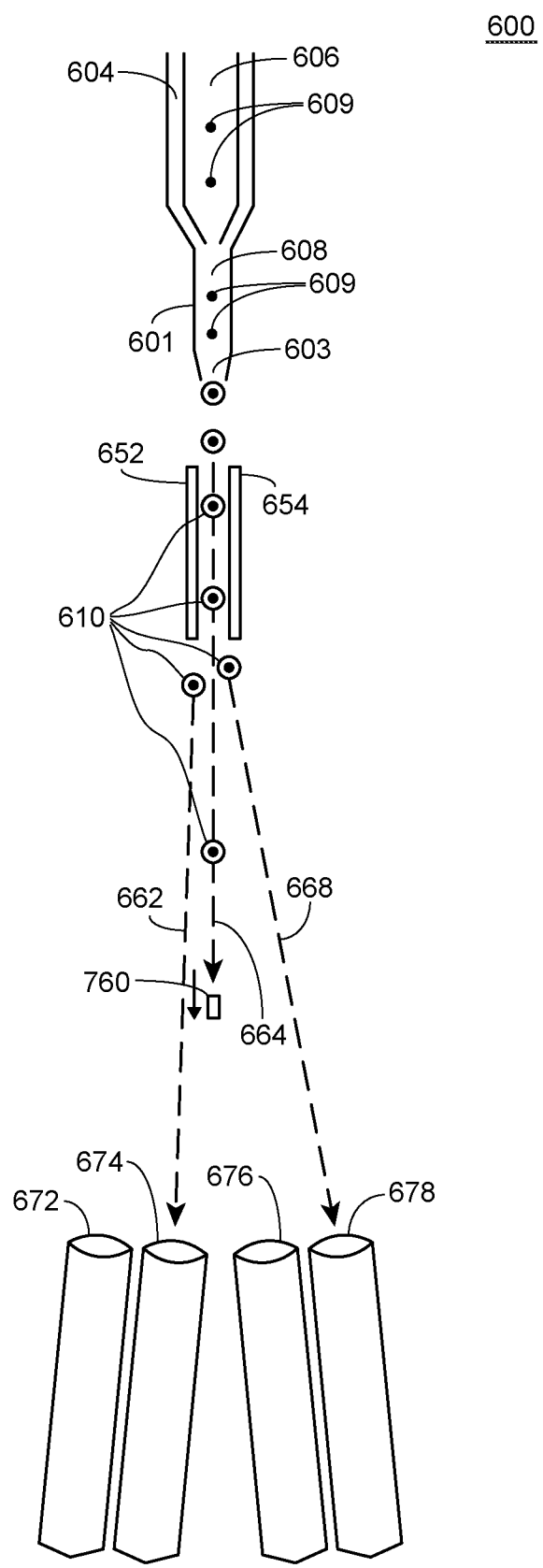
FIG. 6B depicts a schematic drawing of a particle sorter system according to certain embodiments.

FIG. 6B is a schematic drawing of a particle sorter system, in accordance with one embodiment presented herein. The particle sorter system 600 shown in FIG. 6B, includes deflection plates 652 and 654. A charge can be applied via a stream-charging wire in a barb. This creates a stream of droplets 610 containing particles 610 for analysis. The particles can be illuminated with one or more light sources (e.g., lasers) to generate light scatter and fluorescence information. The information for a particle is analyzed such as by sorting electronics or other detection system (not shown in FIG. 6B). The deflection plates 652 and 654 can be independently controlled to attract or repel the charged droplet to guide the droplet toward a destination collection receptacle (e.g., one of 672, 674, 676, or 678). As shown in FIG. 6B, the deflection plates 652 and 654 can be controlled to direct a particle along a first path 662 toward the receptacle 674 or along a second path 668 toward the receptacle 678. If the particle is not of interest (e.g., does not exhibit scatter or illumination information within a specified sort range), deflection plates may allow the particle to continue along a flow path 664. Such uncharged droplets may pass into a waste receptacle such as via aspirator 670.

The sorting electronics can be included to initiate collection of measurements, receive fluorescence signals for particles, and determine how to adjust the deflection plates to cause sorting of the particles. Example implementations of the embodiment shown in FIG. 6B include the BD FACSAria™ line of flow cytometers commercially provided by Becton, Dickinson and Company (Franklin Lakes, NJ).

Computer-Controlled Systems

Aspects of the present disclosure further include computer-controlled systems, where the systems further include one or more computers for complete automation or partial automation. In some embodiments, systems include a computer having a computer readable storage medium with a computer program stored thereon, where the computer program when loaded on the computer includes instructions for irradiating with a light source a sample having particles in a flow stream, detecting light from the irradiated particles in the flow stream, generating a data signal corresponding to a spatial position of droplets comprising particles from the flow stream in an X-Y plane, and adjusting in the X-Y plane a position of a support stage with a closed-loop feedback position encoder in response to the generated data signal.

In some embodiments, the computer controlled systems include memory having instructions stored thereon for aligning the support stage with the spatial position of the droplets from the flow stream. In some embodiments, the computer controlled systems include memory having instructions stored thereon for aligning the support stage by mapping the position of the droplets from the flow stream in the X-Y plane. In some embodiments, the computer controlled systems include memory having instructions stored thereon for aligning the support stage with droplets of the flow stream by mapping the position of the droplets of the flow stream in an X-Y plane mapping the position of the support stage in the X-Y plane and matching the position of the support stage with the position of the droplets of the flow stream in the X-Y plane.

In other embodiments, the computer controlled systems include memory having instructions stored thereon for generating a data signal with the position encoder that includes the position of the support stage in the X-Y plane. In other embodiments, the computer controlled systems include memory having instructions stored thereon for generating with the position encoder a position map of the support stage in the X-Y plane. In other embodiments, the computer controlled systems include memory having instructions stored thereon for generating with the position encoder a data signal that includes the velocity of support stage movement in the X-Y plane. In other embodiments, the computer controlled systems include memory having instructions stored thereon for generating with the position encoder a data signal that includes the acceleration of support stage movement in the X-Y plane. In certain embodiments, the computer controlled systems include memory having instructions for adjusting one or more of the position, velocity and acceleration of the support stage in the X-Y plane in real time in response to data signals generated by the photodetector in response to light from the irradiated particles.

In embodiments, the system includes an input module, a processing module and an output module. The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system.

Systems may include a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques. The processor may be any suitable analog or digital system. In some embodiments, processors include analog electronics which allows the user to manually align a light source with the flow stream based on the first and second light signals. In some embodiments, the processor includes analog electronics which provide feedback control, such as for example negative feedback control.

The system memory may be any of a variety of known or future memory storage devices. Examples include any commonly available random access memory (RAM), magnetic medium such as a resident hard disk or tape, an optical medium such as a read and write compact disc, flash memory devices, or other memory storage device. The memory storage device may be any of a variety of known or future devices, including a compact disk drive, a tape drive, a removable hard disk drive, or a diskette drive. Such types of memory storage devices typically read from, and/or write to, a program storage medium (not shown) such as, respectively, a compact disk, magnetic tape, removable hard disk, or floppy diskette. Any of these program storage media, or others now in use or that may later be developed, may be considered a computer program product. As will be appreciated, these program storage media typically store a computer software program and/or data. Computer software programs, also called computer control logic, typically are stored in system memory and/or the program storage device used in conjunction with the memory storage device.

In some embodiments, a computer program product is described comprising a computer usable medium having control logic (computer software program, including program code) stored therein. The control logic, when executed by the processor the computer, causes the processor to perform functions described herein. In other embodiments, some functions are implemented primarily in hardware using, for example, a hardware state machine. Implementation of the hardware state machine so as to perform the functions described herein will be apparent to those skilled in the relevant arts.

Memory may be any suitable device in which the processor can store and retrieve data, such as magnetic, optical, or solid-state storage devices (including magnetic or optical disks or tape or RAM, or any other suitable device, either fixed or portable). The processor may include a general-purpose digital microprocessor suitably programmed from a computer readable medium carrying necessary program code. Programming can be provided remotely to processor through a communication channel, or previously saved in a computer program product such as memory or some other portable or fixed computer readable storage medium using any of those devices in connection with memory. For example, a magnetic or optical disk may carry the programming, and can be read by a disk writer/reader. Systems of the invention also include programming, e.g., in the form of computer program products, algorithms for use in practicing the methods as described above. Programming according to the present invention can be recorded on computer readable media, e.g., any medium that can be read and accessed directly by a computer. Such media include, but are not limited to: magnetic storage media, such as floppy discs, hard disc storage medium, and magnetic tape; optical storage media such as CD-ROM; electrical storage media such as RAM and ROM; portable flash drive; and hybrids of these categories such as magnetic/optical storage media.

The processor may also have access to a communication channel to communicate with a user at a remote location. By remote location is meant the user is not directly in contact with the system and relays input information to an input manager from an external device, such as a computer connected to a Wide Area Network ("WAN"), telephone network, satellite network, or any other suitable communication channel, including a mobile telephone (i.e., smartphone).

In some embodiments, systems according to the present disclosure may be configured to include a communication interface. In some embodiments, the communication interface includes a receiver and/or transmitter for communicating with a network and/or another device. The communication interface can be configured for wired or wireless communication, including, but not limited to, radio frequency (RF) communication (e.g., Radio-Frequency Identification (RFID), Zigbee communication protocols, WiFi, infrared, wireless Universal Serial Bus (USB), Ultra Wide Band (UWB), Bluetooth® communication protocols, and cellular communication, such as code division multiple access (CDMA) or Global System for Mobile communications (GSM).

In one embodiment, the communication interface is configured to include one or more communication ports, e.g., physical ports or interfaces such as a USB port, an RS-232 port, or any other suitable electrical connection port to allow data communication between the subject systems and other external devices such as a computer terminal (for example, at a physician's office or in hospital environment) that is configured for similar complementary data communication.

In one embodiment, the communication interface is configured for infrared communication, Bluetooth® communication, or any other suitable wireless communication protocol to enable the subject systems to communicate with other devices such as computer terminals and/or networks, communication enabled mobile telephones, personal digital assistants, or any other communication devices which the user may use in conjunction.

In one embodiment, the communication interface is configured to provide a connection for data transfer utilizing Internet Protocol (IP) through a cell phone network, Short Message Service (SMS), wireless connection to a personal computer (PC) on a Local Area Network (LAN) which is connected to the internet, or WiFi connection to the internet at a WiFi hotspot.

In one embodiment, the subject systems are configured to wirelessly communicate with a server device via the communication interface, e.g., using a common standard such as 802.11 or Bluetooth® RF protocol, or an IrDA infrared protocol. The server device may be another portable device, such as a smart phone, Personal Digital Assistant (PDA) or notebook computer; or a larger device such as a desktop computer, appliance, etc. In some embodiments, the server device has a display, such as a liquid crystal display (LCD), as well as an input device, such as buttons, a keyboard, mouse or touch-screen.

In some embodiments, the communication interface is configured to automatically or semi-automatically communicate data stored in the subject systems, e.g., in an optional data storage unit, with a network or server device using one or more of the communication protocols and/or mechanisms described above.

Output controllers may include controllers for any of a variety of known display devices for presenting information to a user, whether a human or a machine, whether local or remote. If one of the display devices provides visual information, this information typically may be logically and/or physically organized as an array of picture elements. A graphical user interface (GUI) controller may include any of a variety of known or future software programs for providing graphical input and output interfaces between the system and a user, and for processing user inputs. The functional elements of the computer may communicate with each other via system bus. Some of these communications may be accomplished in alternative embodiments using network or other types of remote communications. The output manager may also provide information generated by the processing module to a user at a remote location, e.g., over the Internet, phone or satellite network, in accordance with known techniques. The presentation of data by the output manager may be implemented in accordance with a variety of known techniques. As some examples, data may include SQL, HTML or XML documents, email or other files, or data in other forms. The data may include Internet URL addresses so that a user may retrieve additional SQL, HTML, XML, or other documents or data from remote sources. The one or more platforms present in the subject systems may be any type of known computer platform or a type to be developed in the future, although they typically will be of a class of computer commonly referred to as servers. However, they may also be a main-frame computer, a work station, or other computer type. They may be connected via any known or future type of cabling or other communication system including wireless systems, either networked or otherwise. They may be co-located or they may be physically separated. Various operating systems may be employed on any of the computer platforms, possibly depending on the type and/or make of computer platform chosen. Appropriate operating systems include Windows NT®, Windows XP, Windows 7, Windows 8, iOS, Sun Solaris, Linux, OS/400, Compaq Tru64 Unix, SGI IRIX, Siemens Reliant Unix, and others.

Figure 7:
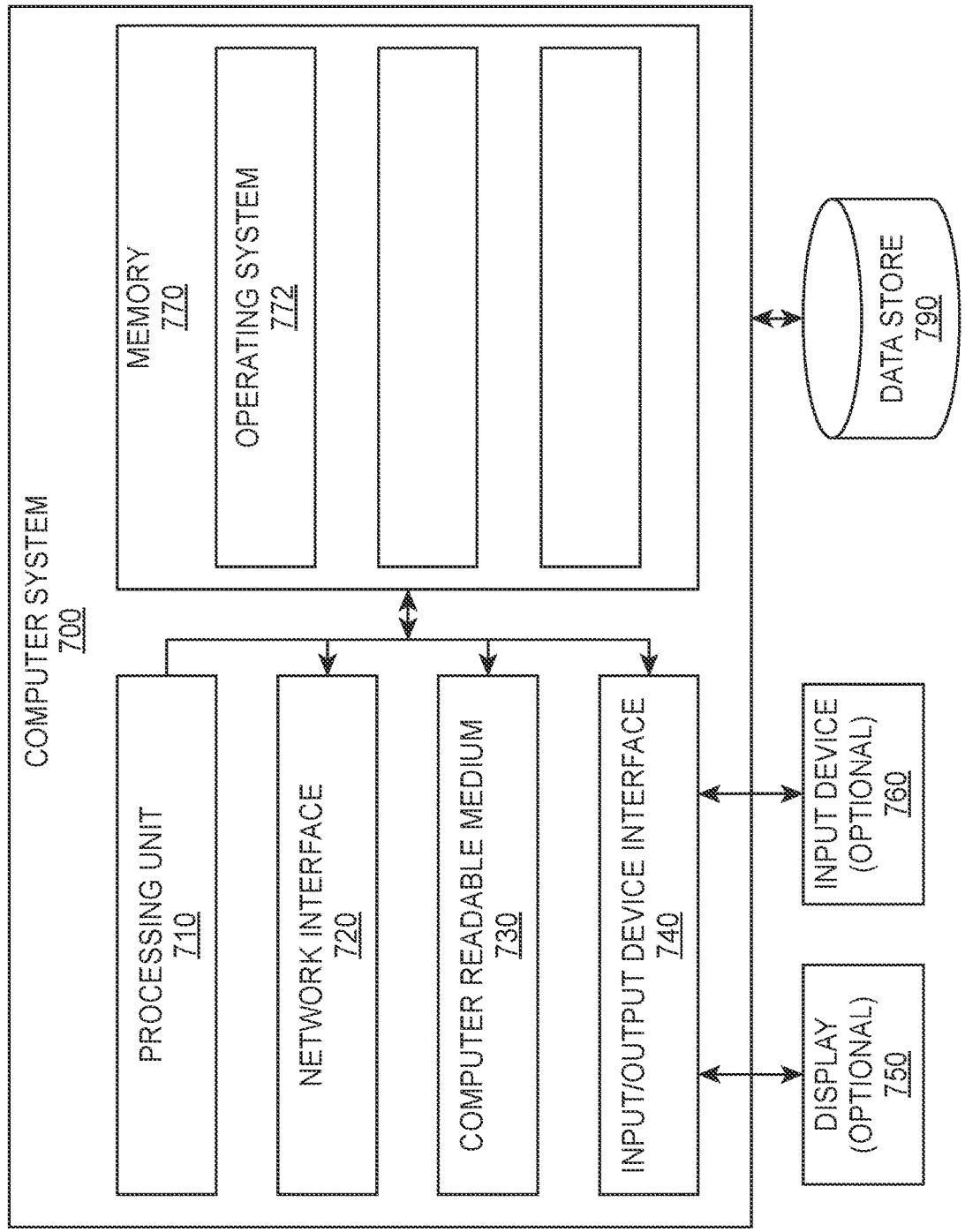
FIG. 7 depicts a block diagram of a computing system according to certain embodiments.

FIG. 7 depicts a general architecture of an example computing device 700 according to certain embodiments. The general architecture of the computing device 700 depicted in FIG. 7 includes an arrangement of computer hardware and software components. The computing device 700 may include many more (or fewer) elements than those shown in FIG. 7. It is not necessary, however, that all of these generally conventional elements be shown in order to provide an enabling disclosure. As illustrated, the computing device 700 includes a processing unit 710, a network interface 720, a computer readable medium drive 730, an input/output device interface 740, a display 750, and an input device 760, all of which may communicate with one another by way of a communication bus. The network interface 720 may provide connectivity to one or more networks or computing systems. The processing unit 710 may thus receive information and instructions from other computing systems or services via a network. The processing unit 710 may also communicate to and from memory 770 and further provide output information for an optional display 750 via the input/output device interface 740. The input/output device interface 740 may also accept input from the optional input device 760, such as a keyboard, mouse, digital pen, microphone, touch screen, gesture recognition system, voice recognition system, gamepad, accelerometer, gyroscope, or other input device.

The memory 770 may contain computer program instructions (grouped as modules or components in some embodiments) that the processing unit 710 executes in order to implement one or more embodiments. The memory 770 generally includes RAM, ROM and/or other persistent, auxiliary or non-transitory computer-readable media. The memory 770 may store an operating system 772 that provides computer program instructions for use by the processing unit 710 in the general administration and operation of the computing device 700. The memory 770 may further include computer program instructions and other information for implementing aspects of the present disclosure.

Methods for Adjusting Parameters of a Support Stage in a Particle Sorter Aspects of the disclosure also include methods for adjusting a position of a support stage of a particle sorter. Methods according to certain embodiments include irradiating with a light source a sample having particles in a flow stream, detecting light from the irradiated particles in the flow stream, generating a data signal corresponding to a spatial position of droplets containing the particles from the flow stream in an X-Y plane and adjusting in the X-Y plane a position of a support stage with a closed-loop feedback position encoder in response to the generated data signal.

In embodiments, methods include irradiating a sample having particles in a flow stream with a light source. In certain embodiments, the sample contains a biological component, or is a biological sample. The term "biological sample" is used in its conventional sense to refer to a sample derived from or containing a whole organism, e.g., a prokaryotic cells, eukaryotic cells, plants, fungi or a subset of animal tissues, cells or component parts which may in certain instances be found in blood, mucus, lymphatic fluid, synovial fluid, cerebrospinal fluid, saliva, bronchoalveolar lavage, amniotic fluid, amniotic cord blood, urine, vaginal fluid and semen. As such, a "biological sample" refers to both the native organism or a subset of its tissues as well as to: a homogenate; isolated, purified or enriched biological particles (e.g., DNA, RNA, proteins, sub-cellular organelles, etc.); and lysates or extracts prepared from the organism or a subset of its tissues, including but not limited to, for example, plasma, serum, spinal fluid, lymph fluid, sections of the skin, respiratory, gastrointestinal, cardiovascular, and genitourinary tracts, tears, saliva, milk, blood cells, tumors, organs. Biological samples may be any type of organismic tissue, including both healthy and diseased tissue (e.g., cancerous, malignant, necrotic, etc.). In certain embodiments, the biological sample is a liquid sample, such as blood or derivative thereof, e.g., plasma, tears, urine, semen, etc., where in some instances the sample is a blood sample, including whole blood, such as blood obtained from venipuncture or fingerstick (where the blood may or may not be combined with any reagents prior to assay, such as preservatives, anticoagulants, etc.).

In certain embodiments the source of the sample is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some instances, the subjects are humans. The methods may be applied to samples obtained from human subjects of both genders and at any stage of development (i.e., neonates, infant, juvenile, adolescent, adult), where in certain embodiments the human subject is a juvenile, adolescent or adult. While embodiments of the present disclosure may be applied to samples from a human subject, it is to be understood that the methods may also be carried-out on samples from other animal subjects (that is, in "non-human subjects") such as, but not limited to, birds, mice, rats, dogs, cats, livestock and horses.

In practicing the subject methods, a sample (e.g., in a flow stream of a particle sorter) is irradiated with light from a light source. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Where methods include irradiating with a broadband light source, broadband light source protocols of interest may include, but are not limited to, a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof.

In other embodiments, methods includes irradiating with a narrow band light source emitting a particular wavelength or a narrow range of wavelengths, such as for example with a light source which emits light in a narrow range of wavelengths like a range of 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Where methods include irradiating with a narrow band light source, narrow band light source protocols of interest may include, but are not limited to, a narrow wavelength LED, laser diode or a broadband light source coupled to one or more optical bandpass filters, diffraction gratings, monochromators or any combination thereof.

In certain embodiments, methods include irradiating the sample with one or more lasers. As discussed above, the type and number of lasers will vary depending on the sample as well as desired light collected and may be a gas laser, such as a helium-neon laser, argon laser, krypton laser, xenon laser, nitrogen laser, $CO_2$ laser, CO laser, argon-fluorine (ArF) excimer laser, krypton-fluorine (KrF) excimer laser, xenon chlorine (XeCl) excimer laser or xenon-fluorine (XeF) excimer laser or a combination thereof. In others instances, the methods include irradiating the flow stream with a dye laser, such as a stilbene, coumarin or rhodamine laser. In yet other instances, methods include irradiating the flow stream with a metal-vapor laser, such as a helium-cadmium (HeCd) laser, helium-mercury (HeHg) laser, helium-selenium (HeSe) laser, helium-silver (HeAg) laser, strontium laser, neon-copper (NeCu) laser, copper laser or gold laser and combinations thereof. In still other instances, methods include irradiating the flow stream with a solid-state laser, such as a ruby laser, an Nd:YAG laser, NdCrYAG laser, Er:YAG laser, Nd:YLF laser, $Nd:YVO_4$ laser, $Nd:YCa_4O(BO_3)_3$ laser, Nd:YCOB laser, titanium sapphire laser, thulim YAG laser, ytterbium YAG laser, $ytterbium_2O_3$ laser or cerium doped lasers and combinations thereof.

The sample may be irradiated with one or more of the above mentioned light sources, such as 2 or more light sources, such as 3 or more light sources, such as 4 or more light sources, such as 5 or more light sources and including 10 or more light sources. The light source may include any combination of types of light sources. For example, in some embodiments, the methods include irradiating the sample in the flow stream with an array of lasers, such as an array having one or more gas lasers, one or more dye lasers and one or more solid-state lasers.

The sample may be irradiated with wavelengths ranging from 200 nm to 1500 nm, such as from 250 nm to 1250 nm, such as from 300 nm to 1000 nm, such as from 350 nm to 900 nm and including from 400 nm to 800 nm. For example, where the light source is a broadband light source, the sample may be irradiated with wavelengths from 200 nm to 900 nm. In other instances, where the light source includes a plurality of narrow band light sources, the sample may be irradiated with specific wavelengths in the range from 200 nm to 900 nm. For example, the light source may be plurality of narrow band LEDs (1 nm-25 nm) each independently emitting light having a range of wavelengths between 200 nm to 900 nm. In other embodiments, the narrow band light source includes one or more lasers (such as a laser array) and the sample is irradiated with specific wavelengths ranging from 200 nm to 700 nm, such as with a laser array having gas lasers, excimer lasers, dye lasers, metal vapor lasers and solid-state laser as described above.

Where more than one light source is employed, the sample may be irradiated with the light sources simultaneously or sequentially, or a combination thereof. For example, the sample may be simultaneously irradiated with each of the light sources. In other embodiments, the flow stream is sequentially irradiated with each of the light sources. Where more than one light source is employed to irradiate the sample sequentially, the time each light source irradiates the sample may independently be 0.001 microseconds or more, such as 0.01 microseconds or more, such as 0.1 microseconds or more, such as 1 microsecond or more, such as 5 microseconds or more, such as 10 microseconds or more, such as 30 microseconds or more and including 60 microseconds or more. For example, methods may include irradiating the sample with the light source (e.g. laser) for a duration which ranges from 0.001 microseconds to 100 microseconds, such as from 0.01 microseconds to 75 microseconds, such as from 0.1 microseconds to 50 microseconds, such as from 1 microsecond to 25 microseconds and including from 5 microseconds to 10 microseconds. In embodiments where sample is sequentially irradiated with two or more light sources, the duration sample is irradiated by each light source may be the same or different.

The time period between irradiation by each light source may also vary, as desired, being separated independently by a delay of 0.001 microseconds or more, such as 0.01 microseconds or more, such as 0.1 microseconds or more, such as 1 microsecond or more, such as 5 microseconds or more, such as by 10 microseconds or more, such as by 15 microseconds or more, such as by 30 microseconds or more and including by 60 microseconds or more. For example, the time period between irradiation by each light source may range from 0.001 microseconds to 60 microseconds, such as from 0.01 microseconds to 50 microseconds, such as from 0.1 microseconds to 35 microseconds, such as from 1 microsecond to 25 microseconds and including from 5 microseconds to 10 microseconds. In certain embodiments, the time period between irradiation by each light source is 10 microseconds. In embodiments where sample is sequentially irradiated by more than two (i.e., 3 or more) light sources, the delay between irradiation by each light source may be the same or different.

The sample may be irradiated continuously or in discrete intervals. In some instances, methods include irradiating the sample in the sample with the light source continuously. In other instances, the sample in is irradiated with the light source in discrete intervals, such as irradiating every 0.001 millisecond, every 0.01 millisecond, every 0.1 millisecond, every 1 millisecond, every 10 milliseconds, every 100 milliseconds and including every 1000 milliseconds, or some other interval.

Depending on the light source, the sample may be irradiated from a distance which varies such as 0.01 mm or more, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more. Also, the angle or irradiation may also vary, ranging from 10° to 90°, such as from 15° to 85°, such as from 20° to 80°, such as from 25° to 75° and including from 30° to 60°, for example at a 90° angle.

As discussed above, light from the irradiated sample is detected by one or more photodetectors in a detection field. Detection fields may vary depending on the properties of the flow stream being irradiated. In embodiments, the detection field may span 0.001 mm or more of the flow stream, such as 0.005 mm or more, such as 0.01 mm or more, such as 0.05 mm or more, such as 0.1 mm or more, such as 0.5 mm or more, such as 1 mm or more, such as 2 mm or more, such as 5 mm or more and including 10 mm or more of the flow stream. Light from the irradiated sample may be measured at one or more wavelengths, such as at 5 or more different wavelengths, such as at 10 or more different wavelengths, such as at 25 or more different wavelengths, such as at 50 or more different wavelengths, such as at 100 or more different wavelengths, such as at 200 or more different wavelengths, such as at 300 or more different wavelengths and including measuring the collected light at 400 or more different wavelengths.

In some embodiments, methods include measuring collected light over a range of wavelengths (e.g., 200 nm-1000 nm). For example, methods may include collecting spectra of light over one or more of the wavelength ranges of 200 nm-1000 nm. In yet other embodiments, methods include measuring collected light at one or more specific wavelengths. For example, the collected light may be measured at one or more of 450 nm, 518 nm, 519 nm, 561 nm, 578 nm, 605 nm, 607 nm, 625 nm, 650 nm, 660 nm, 667 nm, 670 nm, 668 nm, 695 nm, 710 nm, 723 nm, 780 nm, 785 nm, 647 nm, 617 nm and any combinations thereof. In certain embodiments, methods including measuring wavelengths of light which correspond to the fluorescence peak wavelength of certain fluorophores.

The collected light may be measured continuously or in discrete intervals. In some instances, methods include taking measurements of the light continuously. In other instances, the light is measured in discrete intervals, such as measuring light every 0.001 millisecond, every 0.01 millisecond, every 0.1 millisecond, every 1 millisecond, every 10 milliseconds, every 100 milliseconds and including every 1000 milliseconds, or some other interval. Measurements of the collected light may be taken one or more times during the subject methods, such as 2 or more times, such as 3 or more times, such as 5 or more times and including 10 or more times. In certain embodiments, the light propagation is measured 2 or more times, with the data in certain instances being averaged.

Light from the irradiated samples may be detected by any convenient photodetector protocol and may include, but is not limited to photosensors or photodetectors, such as active-pixel sensors (APSs), avalanche photodiodes (APDs), quadrant photodiodes, image sensors, charge-coupled devices (CCDs), intensified charge-coupled devices (ICCDs), light emitting diodes, photon counters, bolometers, pyroelectric detectors, photoresistors, photovoltaic cells, photodiodes, photomultiplier tubes, phototransistors, quantum dot photoconductors or photodiodes and combinations thereof, among other photodetectors. In certain embodiments, the photodetector is a photomultiplier tube, such as a photomultiplier tube having an active detecting surface area of each region that ranges from 0.01 cm² to 10 cm², such as from 0.05 cm² to 9 cm², such as from, such as from 0.1 cm² to 8 cm², such as from 0.5 cm² to 7 cm² and including from 1 cm² to 5 cm².

As summarized above, methods include adjusting a position of a support stage in an X-Y plane with a closed-loop feedback position encoder in response to data signals generated by the photodetectors. In some instances, the position encoder is a negative feedback closed-loop position encoder. In other embodiments, the position encoder is a positive feedback closed-loop position encoder.

In some instances, methods include generating a data signal that includes the position of the support stage in the X-Y plane. In some instances, methods include determining with the position encoder whether the support stage is at a predetermined positioned in the X-Y plane (i.e., is in the desired position in the X-Y plane). For example, the support stage may be determined with the position encoder to be at a position that is 0.00001 µm or more away from a predetermined position in the X-Y plane, such as 0.00005 µm or more, such as 0.0001 µm or more, such as 0.0005 µm or more, such as 0.001 µm or more, such as 0.005 µm or more, such as 0.01 µm or more, such as 0.05 µm or more, such as 0.1 µm or more, such as 0.5 µm or more, such as 1 µm or more, such as 2 µm or more, such as 3 µm or more, such as 4 µm or more, such as 5 µm or more, such as 6 µm or more, such as 7 µm or more, such as 8 µm or more, such as 9 µm or more and including determining with the position encoder that the support stage is 10 µm or more away from a predetermined position in the X-Y plane (i.e., from the desired position in the X-Y plane).

In some instances, methods include generating a position map of the support stage in the X-Y plane. In certain instances, generating the position map includes mapping the position of the support stage relative to a mapped position of the flow stream in the X-Y plane. In some embodiments, the position of the flow stream is mapped in the X-Y plane and the distance of the support stage is determined with the position encoder from the mapped position of the flow stream. In some instances, methods include determining with the position encoder that the support stage is at a position that is 0.00001 µm or more away from the mapped position of the flow stream in the X-Y plane, such as 0.00005 µm or more, such as 0.0001 µm or more, such as 0.0005 µm or more, such as 0.001 µm or more, such as 0.005 µm or more, such as 0.01 µm or more, such as 0.05 µm or more, such as 0.1 µm or more, such as 0.5 µm or more, such as 1 µm or more, such as 2 µm or more, such as 3 µm or more, such as 4 µm or more, such as 5 µm or more, such as 6 µm or more, such as 7 µm or more, such as 8 µm or more, such as 9 µm or more and including determining with the position encoder that the support stage is 10 µm or more away from the mapped position of the flow stream in the X-Y plane.

In some embodiments, methods include generating with the position encoder a negative feedback signal indicating that the support stage is at a distance away from the desired position in the X-Y plane. In some instances, the position encoder generates a negative feedback signal that the support stage is at a distance of 0.00001 µm or more away from the desired position in the X-Y plane, such as 0.00005 µm or more, such as 0.0001 µm or more, such as 0.0005 µm or more, such as 0.001 µm or more, such as 0.005 µm or more, such as 0.01 µm or more, such as 0.05 µm or more, such as 0.1 µm or more, such as 0.5 µm or more, such as 1 µm or more, such as 2 µm or more, such as 3 µm or more, such as 4 µm or more, such as 5 µm or more, such as 6 µm or more, such as 7 µm or more, such as 8 µm or more, such as 9 µm or more and including generating a negative feedback signal when the support stage is positioned at a distance that is 10 µm or more away from the desired position in the X-Y plane.

In some embodiments, methods include generating with the position encoder a negative feedback signal when the distance between the support stage and the desired position in the X-Y plane exceeds a predetermined threshold. In some instances, the position encoder generates a negative feedback signal when the predetermined threshold distance is exceeded by 0.001% or more, such as 0.005% or more, such as 0.01% or more, such as 0.05% or more, such as 0.1% or more, such as 0.5% or more, such as 1% or more, such as 2% or more, such as 3% or more, such as 4% or more, such as 5% or more, such as 10% or more, such as 15% or more, such as 20% or more, such as 25% or more and including generating a negative feedback signal when the predetermined threshold distance is exceeded by 50% or more. In certain instances, methods include generating with the position encoder a negative feedback signal when the predetermined threshold distance is exceeded by 0.00001 µm or more in the X-Y plane, such as 0.00005 µm or more, such as 0.0001 µm or more, such as 0.0005 µm or more, such as 0.001 µm or more, such as 0.005 µm or more, such as 0.01 µm or more, such as 0.05 µm or more, such as 0.1 µm or more, such as 0.5 µm or more, such as 1 µm or more, such as 2 µm or more, such as 3 µm or more, such as 4 µm or more, such as 5 µm or more, such as 6 µm or more, such as 7 µm or more, such as 8 µm or more, such as 9 µm or more and including generating a negative feedback signal when the predetermined threshold distance is exceeded by 10 µm or more.

In some embodiments, methods include aligning the support stage with the flow stream. In some instances, aligning the support stage with the flow stream includes mapping the position of the droplets of the flow stream in an X-Y plane, mapping the position of the support stage in the X-Y plane and matching the position of the support stage with the position of the droplets of the flow stream in the X-Y plane. In certain instances, the position encoder generates a negative feedback signal when the support stage is misaligned with the flow stream. In some instances, the position encoder generates a negative feedback signal when the support stage is misaligned with the flow stream in the X-Y plane by 0.00001 µm or more in the X-Y plane, such as 0.00005 µm or more, such as 0.0001 µm or more, such as 0.0005 µm or more, such as 0.001 µm or more, such as 0.005 µm or more, such as 0.01 µm or more, such as 0.05 µm or more, such as 0.1 µm or more, such as 0.5 µm or more, such as 1 µm or more, such as 2 µm or more, such as 3 µm or more, such as 4 µm or more, such as 5 µm or more, such as 6 µm or more, such as 7 µm or more, such as 8 µm or more, such as 9 µm or more and including generating a negative feedback signal when the support stage is misaligned with the flow stream in the X-Y plane by 10 µm or more.

In some embodiments, methods include collecting particles from the flow stream with one or more containers positioned on the support stages. In some instances, particles are collected downstream from deflector plates where the flow stream droplets have been separated based on charge (e.g., positive, negative and neutral). In these instances, the position encoder generates a data signal corresponding to the spatial positions of the flow streams of the positive, negative and neutral particles. In some instances, methods include comparing the position of the flow stream in the X-Y plane to the position of the flow stream before entering the deflector plates to determine the deviation due to the effects of the deflector plates. In these embodiments, the position encoder generates a distinct data signal corresponding to the position of the flow stream of neutral particles, the flow stream of negative particles and the flow stream of positive particles, or any combination thereof. In one example, the position encoder generates a data signal which corresponds to the flow stream position of neutral particles after deflection by the deflector plates. In another example, the position encoder generates a data signal which corresponds to the flow stream position of negative particles after deflection by the deflector plates. In yet another example, the position encoder generates a data signal which corresponds to the flow stream position of positive particles coming from the deflector plates. In still another example, the position encoder generates a data signal which corresponds to the flow stream positions of the positive particles, the negative particles and the neutral particles.

In some embodiments, methods include adjusting the position of the support stage in an X-Y plane so as to optimize collection of components of the flow stream. In some instances, the position encoder adjusts the position of the support stage to optimize collection of components of the flow stream in response to a negative feedback data signal as described above.

In some embodiments, the position encoder adjusts the position of the support stage in an X-Y plane in response to a data signal corresponding to the spatial position of the flow stream. In some instances, methods include reducing the number of flow stream particles not collected by one or more containers (as described in greater detail below) on the support stage due to misalignment of the flow stream with the collection containers. In certain instances, methods include adjusting the position of the support stage to increase the amount of particles collected by 5% or more as compared to a container on a support stage not adjusted in response to the data signal, such as by 10% or more, such as 15% or more, such as 20% or more, such as 25% or more, such as 35% or more, such as 50% or more, such as 75% or more, such as 90% or more, such as 95% or more and including by 99% or more. In some instances, the position encoder automatically aligns the position of the support stage in response to a data signal corresponding to the spatial position of the flow stream so that the number of particles missed by the container due to misalignment is decreased by 5% or more as compared to a container on a support stage not adjusted in response to the data signal, such as by 10% or more, such as 15% or more, such as 20% or more, such as 25% or more, such as 35% or more, such as 50% or more, such as 75% or more, such as 90% or more, such as 95% or more and including by 99% or more.

In some embodiments, methods include generating with the position encoder a data signal that includes the velocity of support stage movement in the X-Y plane. In some instances, the position encoder generates a data signal that includes a range of velocities of support stage movement in the X-Y plane. In certain instances, the position encoder generates a negative feedback data signal that the support stage velocity is less than a predetermined threshold velocity. For example, a negative feedback data signal may be generated by the position encoder when the support stage velocity is less than the predetermined threshold by 0.01% or more, such as by 0.05% or more, such as by 0.1% or more, such as by 0.5% or more, such as by 1% or more, such as by 2% or more, such as by 3% or more, such as by 4% or more, such as by 5% or more, such as by 6% or more, such as by 7% or more, such as by 8% or more, such as by 9% or more, such as by 10% or more, such as by 20% or more and including generating with the position encoder a negative feedback data signal when the support stage velocity is less than the predetermined threshold by 25% or more.

In some embodiments, methods include generating with the position encoder a data signal that includes the acceleration of support stage movement in the X-Y plane. In some instances, the position encoder generates a data signal that includes a range of accelerations of support stage movement in the X-Y plane. In certain instances, the position encoder generates a negative feedback data signal that the support stage acceleration is less than a predetermined threshold acceleration. For example, a negative feedback data signal may be generated by the position encoder when the support stage acceleration is less than the predetermined threshold by 0.01% or more, such as by 0.05% or more, such as by 0.1% or more, such as by 0.5% or more, such as by 1% or more, such as by 2% or more, such as by 3% or more, such as by 4% or more, such as by 5% or more, such as by 6% or more, such as by 7% or more, such as by 8% or more, such as by 9% or more, such as by 10% or more, such as by 20% or more and including generating with the position encoder a negative feedback data signal when the support stage acceleration is less than the predetermined threshold by 25% or more.

In some embodiments, methods further include sorting one or more particles (e.g., cells) of the sample. The term "sorting" is used herein in its conventional sense to refer to separating components (e.g., cells, non-cellular particles such as biological macromolecules) of the sample and in some instances delivering the separated components to one or more sample collection containers positioned on the support stage. For example, methods may include sorting samples having 2 or more components, such as 3 or more components, such as 4 or more components, such as 5 or more components, such as 10 or more components, such as 15 or more components and including sorting a sample having 25 or more components. One or more of the sample components may be separated from the sample and delivered to a sample collection container, such as 2 or more sample components, such as 3 or more sample components, such as 4 or more sample components, such as 5 or more sample components, such as 10 or more sample components and including 15 or more sample components may be separated from the sample and delivered to a sample collection container.

A particular subpopulation of interest may then further analyzed by "gating" based on the data collected for the entire population. To select an appropriate gate, the data is plotted so as to obtain the best separation of subpopulations possible. This procedure may be performed by plotting forward light scatter (FSC) vs. side (i.e., orthogonal) light scatter (SSC) on a two-dimensional dot plot. A subpopulation of particles is then selected (i.e., those cells within the gate) and particles that are not within the gate are excluded. Where desired, the gate may be selected by drawing a line around the desired subpopulation using a cursor on a computer screen. Only those particles within the gate are then further analyzed by plotting the other parameters for these particles, such as fluorescence. Where desired, the above analysis may be configured to yield counts of the particles of interest in the sample.

In some embodiments, methods include sorting components of a sample, such as described in U.S. Pat. Nos. 10,006,852; 9,952,076; 9,933,341; 9,784,661; 9,726,527; 9,453,789; 9,200,334; 9,097,640; 9,095,494; 9,092,034; 8,975,595; 8,753,573; 8,233,146; 8,140,300; 7,544,326;

7,201,875; 7,129,505; 6,821,740; 6,813,017; 6,809,804; 6,372,506; 5,700,692; 5,643,796; 5,627,040; 5,620,842; 5,602,039; the disclosures of which are herein incorporated by reference in their entirety. In some embodiments, methods for sorting components of sample include sorting particles (e.g., cells in a biological sample) with an enclosed particle sorting module, such as those described in U.S. Patent Publication No. 2017/0299493, the disclosure of which is incorporated herein by reference. In certain embodiments, particles (e.g., cells) of the sample are sorted using a sort decision module having a plurality of sort decision units, such as those described in U.S. Patent Publication No. 2020/0256781, the disclosure of which is incorporated herein by reference. In some embodiments, methods for sorting components of sample include sorting particles (e.g., cells in a biological sample) with a particle sorting module having deflector plates, such as described in U.S. Patent Publication No. 2017/0299493, filed on Mar. 28, 2017, the disclosure of which is incorporated herein by reference.

In some embodiments, methods include maintaining the temperature of samples collected in the one or more sample collection containers. In certain embodiments, the temperature of the collected samples is maintained with a temperature controller that maintains the temperature of samples in the sample containers in a predetermined range, such as at a temperature which ranges from −25° C. to 100° C., such as from −20° C. to 90° C., such as from −15° C. to 80° C., such as from −10° C. to 70° C., such as from −5° C. to 60° C., such as from 0° C. to 50° C., such as from 5° C. to 40° C., such as from 10° C. to 30° C. and including from 15° C. to 25° C. In certain embodiments, the temperature controller is a closed-loop negative feedback temperature controller which generates a data signal when the temperature of the support stage exceeds or falls below a predetermined temperature threshold. In some instances, when the temperature of the support stage falls below a predetermined temperature threshold, the temperature controller generates a data signal indicating that the temperature needs to be increased, For example, the temperature controller generates a data signal when the temperature measured by the temperature controller falls below a temperature threshold by 0.001° C. or more, such as by 0.005° C. or more, such as by 0.01° C. or more, such as by 0.05° C. or more, such as by 0.1° C. or more, such as by 0.5° C. or more, such as by 1° C. or more. In other instances, the temperature controller generates a data signal when the temperature of the support stage exceeds a predetermined temperature threshold. For example, the temperature controller generates a data signal that indicates that the temperature needs to be decreased such as by decreasing the temperature by 0.001° C. or more, such as by 0.005° C. or more, such as by 0.01° C. or more, such as by 0.05° C. or more, such as by 0.1° C. or more, such as by 0.5° C. or more and including by 1° C. or more.

In certain embodiments, methods include adjusting or maintaining with a temperature controller the temperature of samples present in specific sample collection containers on the support stage. In some instances, methods include determining that one or more of the sample containers positioned on the support stage needs a temperature adjustment. For example, the temperature controller determines that one or more sample wells of a microplate is in need of temperature adjustment. In these instances, the temperature controller adjusts the temperature of each specific sample collection container (e.g., each specific sample well), such as by increasing or decreasing the temperature by 0.001° C. or more, such as by 0.005° C. or more, such as by 0.01° C. or more, such as by 0.05° C. or more, such as by 0.1° C. or more, such as by 0.5° C. or more, such as by 1° C. or more, such as by 2° C. or more, such as by 3° C. or more, such as by 4° C. or more, such as by 5° C. or more, such as by 10° C. or more and including by 15° C. or more.

As discussed above, the subject methods may be fully automated, such that adjustments by the position encoder or temperature controller are made with little, if any, human intervention or manual input by the user.

Non-Transitory Computer-Readable Storage Medium

Aspects of the present disclosure further include non-transitory computer readable storage mediums having instructions for practicing the subject methods. Computer readable storage mediums may be employed on one or more computers for complete automation or partial automation of a system for practicing methods described herein. In certain embodiments, instructions in accordance with the method described herein can be coded onto a computer-readable medium in the form of "programming", where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-R, magnetic tape, non-volatile memory card, ROM, DVD-ROM, Blue-ray disk, solid state disk, and network attached storage (NAS), whether or not such devices are internal or external to the computer. A file containing information can be "stored" on computer readable medium, where "storing" means recording information such that it is accessible and retrievable at a later date by a computer. The computer-implemented method described herein can be executed using programming that can be written in one or more of any number of computer programming languages. Such languages include, for example, Java (Sun Microsystems, Inc., Santa Clara, CA), Visual Basic (Microsoft Corp., Redmond, WA), and C++ (AT&T Corp., Bedminster, NJ), as well as any many others.

In some embodiments, computer readable storage media of interest include a computer program stored thereon, where the computer program when loaded on the computer includes instructions having algorithm for irradiating with a light source a sample having particles in a flow stream, algorithm for detecting light from the irradiated particles in the flow stream, algorithm for generating a data signal corresponding to a spatial position of droplets comprising particles from the flow stream in an X-Y plane, and algorithm for adjusting in the X-Y plane a position of a support stage with a closed-loop feedback position encoder in response to the generated data signal.

In some embodiments, the non-transitory computer readable storage medium includes algorithm for aligning the support stage with the spatial position of the droplets from the flow stream. In some embodiments, the non-transitory computer readable storage medium includes algorithm for aligning the support stage by mapping the position of the droplets from the flow stream in the X-Y plane. In some embodiments, the non-transitory computer readable storage medium includes algorithm for aligning the support stage with droplets of the flow stream by mapping the position of the droplets of the flow stream in an X-Y plane, mapping the position of the support stage in the X-Y plane and matching the position of the support stage with the position of the droplets of the flow stream in the X-Y plane.

In other embodiments, the non-transitory computer readable storage medium includes algorithm for generating a data signal with the position encoder that includes the position of the support stage in the X-Y plane. In other embodiments, the non-transitory computer readable storage medium includes algorithm for generating with the position encoder a position map of the support stage in the X-Y plane. In other embodiments, the non-transitory computer readable storage medium includes algorithm for generating with the position encoder a data signal that includes the velocity of support stage movement in the X-Y plane. In other embodiments, the non-transitory computer readable storage medium includes algorithm for generating with the position encoder a data signal that includes the acceleration of support stage movement in the X-Y plane. In certain embodiments, the non-transitory computer readable storage medium includes algorithm for adjusting one or more of the position, velocity and acceleration of the support stage in the X-Y plane in real time in response to data signals generated by the photodetector in response to light from the irradiated particles.

The non-transitory computer readable storage medium may be employed on one or more computer systems having a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

Kits

Aspects of the present disclosure further include kits, where kits include one or more of the components of light detection systems described herein. In some embodiments, kits include a flow cell for propagating a sample comprising particles through a flow stream, a light source, a photodetector and a support stage coupled to a closed-loop feedback position encoder and a linear shaft servo motor. In some instances, the closed-loop feedback position encoder is a positive feedback closed-loop position encoder. In some instances, the closed-loop feedback position encoder is a negative feedback closed-loop position encoder. In some instances, the closed-loop feedback position encoder comprises a magnetic encoder. In some instances, the closed-loop feedback position encoder comprises an incremental magnetic encoder. In some instances, the linear shaft servo motor is a continuous motion servo motor. In some instances, the linear shaft servo motor is a bidirectional motion servo motor.

In certain embodiments, kits further include a temperature controller. In some instances, kits include a sample collection container such as a microplate. Kits may also include one or more lasers, such as a continuous wave laser. In certain instances, kits include programming for the subject systems, such as in the form of a computer readable medium (e.g., flash drive, USB storage, compact disk, DVD, Blu-ray disk, etc.) or instructions for downloading the programming from an internet web protocol or cloud server. Kits may also include an optical adjustment component, such as lenses, mirrors, filters, fiber optics, wavelength separators, pinholes, slits, collimating protocols and combinations thereof.

Kits may further include instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, and the like. Yet another form of these instructions is a computer readable medium, e.g., diskette, compact disk (CD), portable flash drive, and the like, on which the information has been recorded. Yet another form of these instructions that may be present is a website address which may be used via the internet to access the information at a removed site.

Utility

The subject systems, methods, and computer systems find use in a variety of different applications where it is desirable to automate adjustments to one or more parameters of a flow cytometer to provide for fast, reliable systems for characterizing and sorting cells from a biological sample. Embodiments of the present disclosure find use where minimizing the amount of reliance on human input and adjustments to the system are desired, such as in research and high throughput laboratory testing. The present disclosure also finds use where it is desirable to provide a flow cytometer with improved cell sorting accuracy, enhanced particle collection, systems which provide alerts regarding component malfunction (e.g., misalignment of the support stage or one or more containers for collecting particles from a sample), reduced energy consumption and enhanced particle deflection during cell sorting. In embodiments, the present disclosure reduces the need for user input or manual adjustment during sample analysis with a flow cytometer. In certain embodiments, the subject systems provide fully automated protocols so that adjustments to a flow cytometer during use require little, if any human input.

The present disclosure also finds use in applications where cells prepared from a biological sample may be desired for research, laboratory testing or for use in therapy. In some embodiments, the subject methods and devices may facilitate the obtaining individual cells prepared from a target fluidic or tissue biological sample. For example, the subject methods and systems facilitate obtaining cells from fluidic or tissue samples to be used as a research or diagnostic specimen for diseases such as cancer. Likewise, the subject methods and systems facilitate obtaining cells from fluidic or tissue samples to be used in therapy. Methods and devices of the present disclosure allow for separating and collecting cells from a biological sample (e.g., organ, tissue, tissue fragment, fluid) with enhanced efficiency and low cost as compared to traditional flow cytometry systems.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112(f) or 35 U.S.C. § 112(6) is not invoked.

What is claimed is:

1. A particle sorter comprising:
   a flow cell configured to propagate a sample comprising particles through a flow stream;
   a light source configured to irradiate particles in the flow stream;
   a photodetector configured to detect light from particles in the irradiated flow stream;
   a support stage operationally coupled to the photodetector and comprising a position encoder, wherein the support stage is configured to adjust position of a sample collection container present on the support stage in an X-Y plane in response to i) a data signal generated by the photodetector in response to light from the irradiated particles and ii) a closed-loop feedback provided as a data signal generated by the position encoder;
   wherein the position encoder comprises a read head and encoder scales to represent X and Y directions in the X-Y plane.

2. The particle sorter according to claim 1, wherein the position encoder comprises a magnetic encoder.

3. The particle sorter according to claim 2, wherein the position encoder comprises an incremental magnetic encoder.

4. The particle sorter according to claim 1, wherein the position encoder is configured to generate a data signal that comprises the position of the support stage in the X-Y plane.

5. The particle sorter according to claim 4, wherein the position encoder is configured to generate a position map of the support stage in the X-Y plane.

6. The particle sorter according to claim 1, wherein the position encoder is configured to generate a data signal that comprises the velocity of support stage movement in the X-Y plane.

7. The particle sorter according to claim 1, wherein the position encoder is configured to generate a data signal that comprises the acceleration of support stage movement in the X-Y plane.

8. The particle sorter according to claim 1, wherein the position encoder is configured to provide real-time closed-loop feedback provided as data signals comprising one or more of the position, velocity and acceleration of the support stage in the X-Y plane.

9. The particle sorter according to claim 1, wherein the support stage is configured to adjust one or more of the position, velocity and acceleration of the sample container present on the support stage in the X-Y plane in real time in response to data signals generated by the photodetector in response to light from the irradiated particles.

10. The particle sorter according to claim 1, wherein the support stage comprises a linear shaft servo motor.

11. The particle sorter according to claim 1, wherein the sample collection container is a microplate.

12. The particle sorter according to claim 1, wherein the support stage further comprises a temperature controller.

13. The particle sorter according to claim 12, wherein the temperature controller is configured to adjust the temperature of the sample collection container.

14. The particle sorter according to claim 1, wherein the particle sorter further comprises a droplet deflector configured to apply a deflection force to droplets comprising particles from the flow stream.

15. The particle sorter according to claim 14, wherein the droplet deflector is configured to apply a deflection force sufficient to deflect droplets a predetermined distance in response to a data signal from the position encoder.

16. The particle sorter according to claim 1, wherein the light source comprises one or more lasers.

17. The particle sorter according to claim 16, wherein the light source comprises a continuous wave laser.

18. The particle sorter according to claim 1, wherein the flow cell comprises a sheath fluid input and a sample input.

19. The particle sorter according to claim 1, wherein the particle sorter is part of a flow cytometer.

* * * * *